United States Patent [19]

Gardner et al.

[11] Patent Number: 5,051,845
[45] Date of Patent: Sep. 24, 1991

[54] CLOSED-LOOP POST PRODUCTION PROCESS

[76] Inventors: Larry J. Gardner, 1632 Pricewood La., Apex, N.C. 27511; David H. Scoggins, 6100 Donny Brook Dr., Raleigh, N.C. 27606

[21] Appl. No.: 344,097
[22] Filed: Apr. 27, 1989
[51] Int. Cl.⁵ .................... G11B 27/028; G11B 27/00
[52] U.S. Cl. ...................................... 360/14.1; 369/83
[58] Field of Search .............. 358/311; 360/14.1, 35.1, 360/14.2, 14.3; 369/83

[56] References Cited

U.S. PATENT DOCUMENTS

| | | | |
|---|---|---|---|
| 4,115,819 | 9/1978 | Shigeta | 360/14.1 |
| 4,355,332 | 10/1982 | Beeson | 360/14.1 |
| 4,428,001 | 1/1984 | Yamamura | 360/14.1 |
| 4,706,135 | 11/1987 | Kojima | 360/14.1 |
| 4,746,994 | 5/1988 | Ettlinger | 360/14.1 |
| 4,774,600 | 9/1988 | Baumeister | 360/14.1 |
| 4,858,027 | 8/1989 | Saskou | 358/311 |
| 4,891,715 | 1/1990 | Levy | 360/14.1 |
| 4,899,229 | 2/1990 | Hashimoto | 360/14.1 |

OTHER PUBLICATIONS

International Broadcast Engineer, Nov. 1979, s#0436.

Primary Examiner—Stuart S. Levy
Assistant Examiner—Tan Nguyen
Attorney, Agent, or Firm—Rhodes, Coats & Bennett

[57] ABSTRACT

The present invention is a post production process for assembling a video program from a body of source material by adding source materials to the master program in a series of jobs. During the initial job, edited source materials are simultaneously recorded in the master program medium and a temporary archive media which temporarily stores each program segment. During each subsequent job, the new program segment recorded into the program is simultaneously recorded in the temporary archive media, and the previously recorded program segment is played back from the temporary archive media synchronously and automatically with the program so that it is available as a source material to which additional source materials can be added in layers to create the next program segment.

10 Claims, 21 Drawing Sheets

# CLOSED-LOOP POST PRODUCTION PROCESS

FIELD OF THE INVENTION

The present invention relates generally to video post production and editing processes and more particularly to a closed-loop video post production process in which program segments recorded into the program are made available as source material to be used in creating subsequent program segments.

BACKGROUND OF THE INVENTION

Television post production is the selection, processing and assembly of individual images and sounds to form a finished program of any length. Conventional post production is based on the process of selectively copying and processing scenes from a "source" tape to a record or destination tape. Generally, the control system allows transitions other than cuts including dissolves, wipes, digital effects, etc. The control system, in cooperation with a video switcher, also permits stills or moving keys to be placed over the source pictures in various ways. Because all picture elements must be presented simultaneously to switching and processing equipment and subsequently to the destination tape, the control system must be capable of operating a number of source tape machines which must be synchronized to a very high degree of accuracy. This requirement places severe limitations on the capability of a conventional editing system since transitions, other than cuts, require that scenes involved in the transitions be on separate reels of tape, mounted on separate machines.

Another drawback with conventional post production systems, is the quality degradations which occur with multiple generations. For instance, it is not uncommon to dissolve from one scene on a source tape to another scene on the same tape. Since both scenes must be presented simultaneously to the switching and processing equipment, a copy of one of the scenes must be made on a separate tape called a B-roll. Signal distortions introduced during the recording process, along with analog switching and processing devices, cause deterioration in the quality of the visual image being copied. Such generation losses through multiple generations of analog tape present a practical limit to the number of generations which may be used in conventional post production processes. Accordingly, conventional edit control systems have been designed to minimize the number of generations, and the industry standard edit decision list (EDL) is specifically geared to single pass operation.

The industry standard edit decision list provides a mechanism to trace each scene in the program back to the source from which it came. However, it does not provide an audit trail back to the original materials if the source is not itself an original. In other words, there is not automatic tracking through multiple generations. Further, the industry standard edit decision list has no mechanism for tracing non-video tape sources such as titles, live video from a camera, or sound recorded directly from a microphone. It does not accommodate any changes made to source material during editing, such as color correction or changes in picture size or position.

SUMMARY AND OBJECTS OF THE INVENTION

The present invention utilizes a composite digital video tape recorder in combination with a large digital memory for short term storage of video signals in a new, closed-loop editing post production system. While source material is recorded into the program (i.e. to the digital video tape recorder), the same material is simultaneously recorded into the short term digital memory. The program segment stored in digital memory is identical to the program tape, but may be used as a source to which additional elements or layers can be added.

In the preferred embodiment of the invention, the digital memory is divided into two segments or caches. When source material is recorded into the program, it is simultaneously recorded in one segment of the cache. When the next scene or element is added, the previously recorded program segment is played back from the cache synchronously and automatically with the program. The old program segment is therefore available as source material to which additional source material can be added in layers to create the next program segment. The play and record status of the caches flop after each job so that the most recent program segment recorded is always played back from one segment of the cache while the new program segment is simultaneously recorded into the current record segment of the cache. The layering of new source materials over old program segments played back from memory can be accomplished with virtually no loss in signal quality since the editing is done in the digital domain.

The editing process takes place in an all-digital environment and makes multiple generation editing a normal operation. Source materials can be added to the program one at a time in multiple layers, thus requiring only a single source machine. Similarly, a single channel digital effects unit could be used as many times as necessary in a given scene to accomplish any effect that its multiple channel equivalent can do. The same is true for the production switcher. A single digital mix effects bank can accomplish the same effects as a multiple re-entry analog switcher just by using it as many times as needed.

From the foregoing, it is apparent that the primary object of the present invention is to provide a video post production process wherein the editing takes place in an all digital environment to minimize deterioration in signal quality.

Another object of the present of the present invention is to provide a post production system in which unedited source materials can be copied into the program in multiple layers and through multiple generations without loss in signal quality.

A further object of the present invention is to provide a post production system which utilizes a closed-loop in a digital environment where previously assembled program elements can be re-entered into the system and used as source material to which additional source materials can be added in layers to produce new intermediate program elements.

Another object of the present invention is to provide a post production system and process which provides a complete audit trail through multiple generations so that programs can be re-assembled.

Another object of the present invention is to provide a post production process which minimizes the number of tasks to be preformed by the editor so that the editor can concentrate on the creative task of assembling sounds and pictures.

Other objects and advantages of the present invention will become apparent and obvious from a study of the following description and the accompanying drawings which are merely illustrative of such invention.

BRIEF DESCRIPTION OF DRAWINGS

FIG. 1B is a functional schematic diagram of the video sequence recorder;

DETAILED DESCRIPTION OF THE INVENTION

Figure 1:
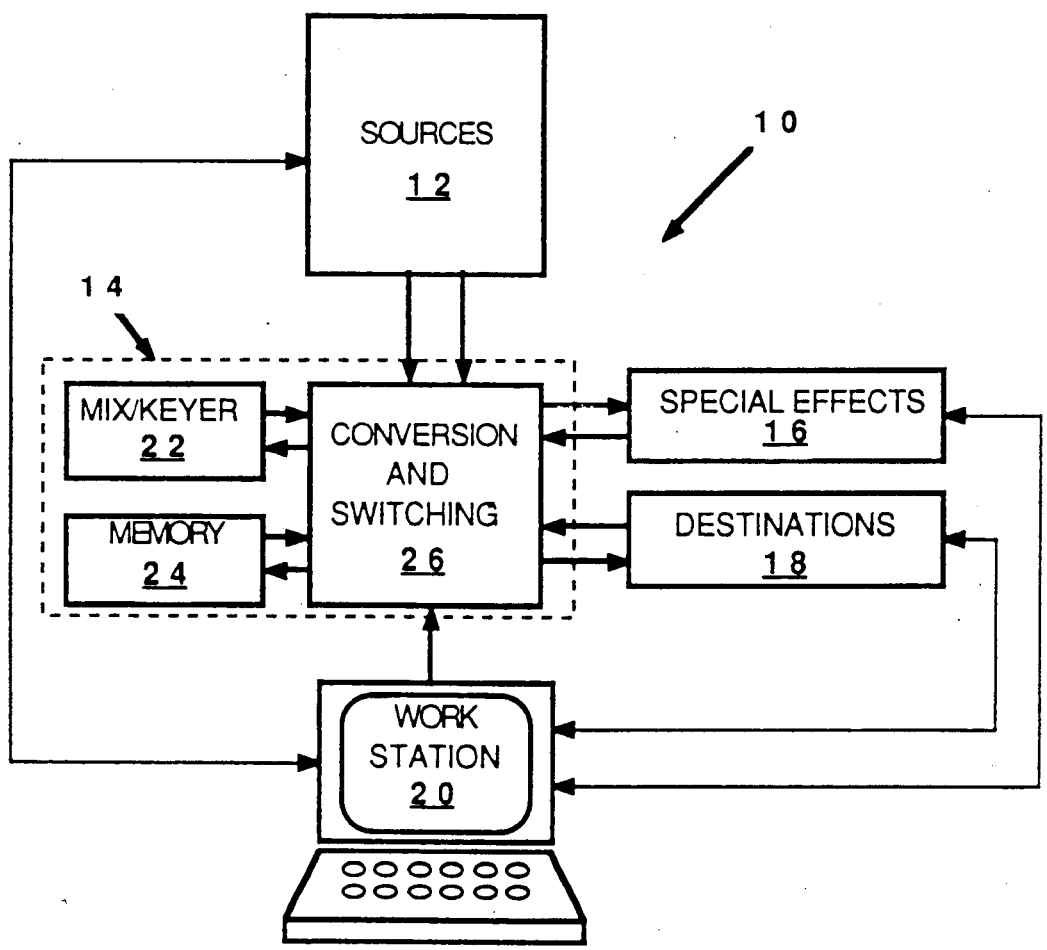
FIG. 1 is a blocked diagram of the post production system of the present invention.

FIG. 1 shows the major components of the post production system 10 of the present invention in block diagram form. The post production system 10 includes one or more sources 12, a video sequence recorder 14, a special effects unit 16, one or more destinations 18, and a computer or work station 20 which controls the other components in the system.

The heart of the post production system 10 is the digital video sequence recorder 14. The video sequence recorder 14 includes a random access memory (RAM) 24 and a digital mix/keyer 22 with foreground, background and key inputs. The video sequence recorder also includes the necessary switching and conversion systems 26.

A functional block diagram of the video sequence recorder 14 is shown in FIG. 1B. The video sequence recorder shown in FIG. 1B is a commercially available product sold by NEC under the trademark VSR-10. The video sequence recorder 14 has both analog and digital inputs and outputs, as well as a key input. The video sequence recorder also has its own digital switching system 28 which is capable of routing video signals from any analog or digital input to any analog or digital output. Analog video signals sent to the video sequence recorder 14 are converted to digital by analog-to-digital converters 30 and, if needed, output is converted to analog by digital-to-analog converters 32. Each pair of input and output ports may be thought of as a channel and each is capable of operating as a complete video recorder/player which can record or play back at any speed in either direction. Each channel has access to all available memory for recording or play back and may individually address each field.

The random access memory 24 includes four write channels and four read channels and is capable of storing thirty-four seconds of real time video, which is equal to 1,020 frames or 2,040 fields. Each field is stored in a separate address of the memory. The memory can be expanded in thirty-four second increments up to a maximum of 136 seconds or 4,080 frames.

The mix/keyer 22 is capable of combining three sources including a key, foreground and background. Output from the mix/keyer is sent back to the routing switch 28. The video sequence recorder 14 is therefore capable of performing keys or mixes internally using various segments of memory, or using external video sources.

The destination 18 is generally a record video tape recorder which is preferably a SMPTE type D-2 composite digital video tape recorder. (D-video tape recorder) The possible sources 12 include one or more conventional analog video tape recorders (video tape recorders), cameras, character generators, or other sources of video. The system may also include special effects equipment such as a digital video effect unit, a key processor and/or wipe generator.

All of the system components are controlled by a computer 20, such as an Apple Macintosh II, which serves as the work station. There is no edit controller as in conventional video editing system. The computer includes a display monitor, a standard computer keyboard, and a mouse, track ball or graphics pad. The software operating on the computer has a menu driven user interface and commands are entered using standard input devices. A system interface unit (SIU) may be provided to handle low level serial communication tasks with the other components of the post-production system 10. The SIU may, for example, be an intelligent quad serial communication card such as the Hurdler HQS manufactured by Creative Solutions.

Figure 1A:
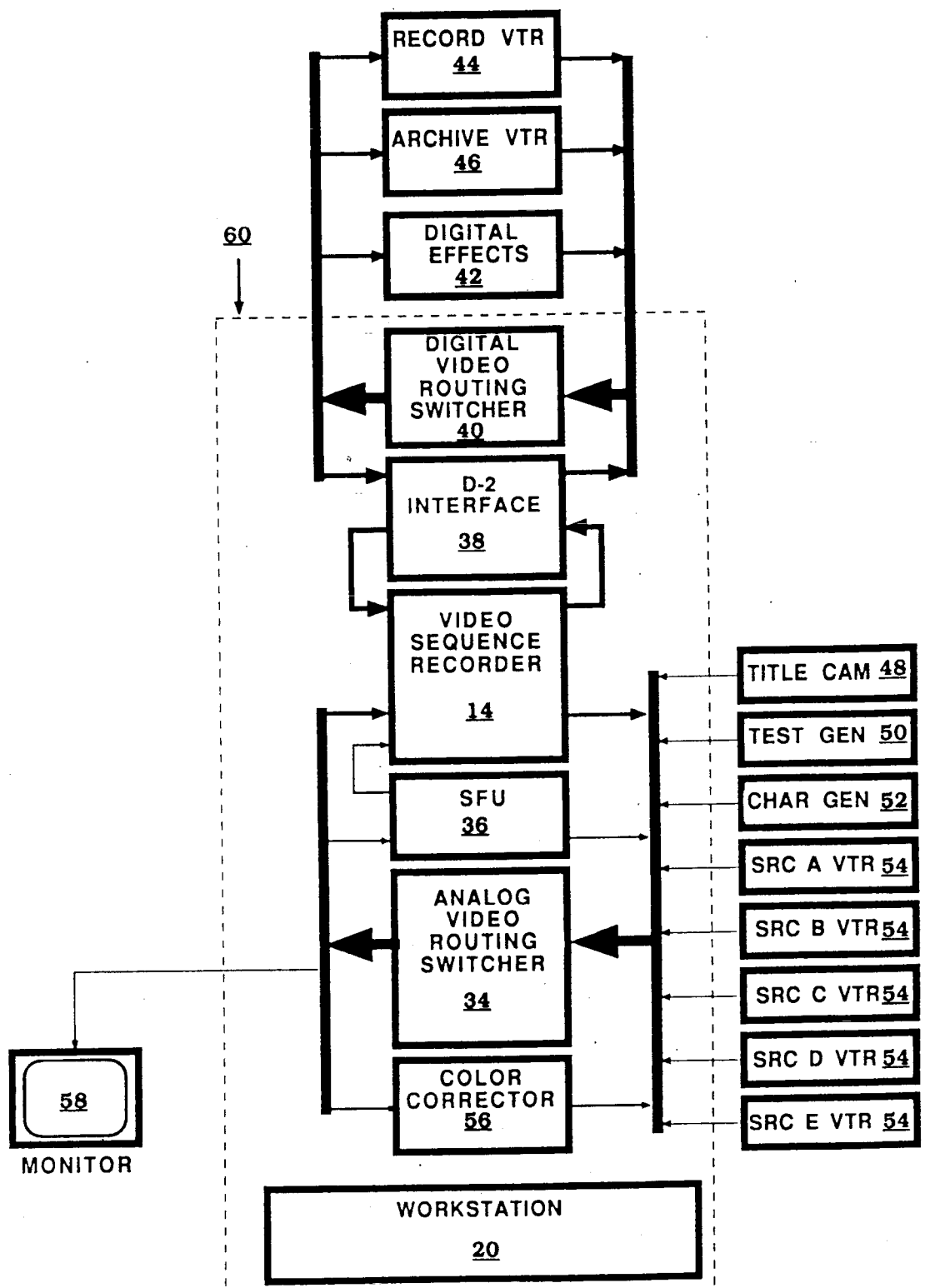
FIG. 1A is a detailed schematic of the post production system of the present invention.

FIG. 1A shows a detailed schematic of the post production system 10 of the present invention. As shown in FIG. 1A, the post production system includes a video processing module indicated generally at 60 to which a variety of peripheral devices are operatively connected. At the heart of the video processing module 60 is the video sequence recorder 14. Since the video sequence recorder 14 has only four inputs, the video processing module 60 incorporates a conventional analog routing switcher 34 to which a larger number of sources may be connected. The embodiment illustrated includes five source video tape recorders 54. The source video tape recorders (video tape recorders) will generally be conventional analog recorders, although digital recorders could also be used. Other sources include a title camera 48, test generator 50 and character generator 52, all of which are connected to the analog routing switcher 34.

Typically, video signals are output from the routing switcher 34 to the system function unit 36 or the video sequence recorder 14. The system function unit 36 operates as a key processor and wipe pattern generator. Key signals are sent by the system function unit 36 to key input of the video sequence recorder 14. The analog routing switcher 34 can also output video signals in analog to a color corrector 56 which outputs the color corrected video signals to the video sequence recorder 14. A video monitor 58 is also connected to the routing switcher 34 so that source materials and program segments can be viewed by the editor.

The video sequence recorder 14, in a preferred mode of operation, outputs digital video signals to a record video tape recorder 44, archive video tape recorder 46 and digital effects unit 42 via the D-2 interface 38 and digital routing switcher 40. If the video sequence recorder is fully compatible with D-2, the D-2 interface 38 is not necessary. The archive video tape recorder 46 and record video tape recorder 44 are preferably a SMPTE type D-2 composite digital video tape recorder with both digital and analog inputs and outputs. The digital effects unit 42 is a standard digital video effect such as the NEC DVE System-10. The output of the digital effects unit 42, record video tape recorder 44 and archive video tape recorder 46 can be sent back to the video sequence recorder 14 via the digital video routing switcher 40 and D-2 interface 38 forming a closed loop in which program segments can be re-entered into the video processing module 60 as will be hereinafter described. The work station 20 is operatively connected to the source video tape recorders 54, analog video routing switcher 34, system function unit 36, video sequence recorder 14, digital video routing switcher 40 and character generator 52.

The key to the operability of the post production system 10 is the software which provides a user interface allowing the operator to control all functions of the system from the work station 20. The software uses a new form of system control and a unique method of storing data required for assembly or re-assembly of a program. A critical aspect of the software and control system is the structure of its decision list. Conventional editing systems define each "edit" in a program as an "end" or beginning time code and an "out" or end time code for each scene's source material and for its location on the program tape. The production process is defined by an edit decision list, EDL, which is a list of the time code numbers for each edit. The time codes are recorded on the tape with a unique number for each frame and provide means for determining location of "scenes" on the tape.

The present invention abandons the old edit decision list in favor of a new approach to list management. Instead of defining the production process as a series of edits, the present invention divides the process into a series of "jobs" and "events." A job is defined as a period of program time in which the time relationship or synchronization between a source and the program tape does not change. An event is an instant of program time in which something happens i.e. radio recording begins, audio recording ends, a video transition occurs, etc. A job could contain a virtually unlimited number of events, unlike the conventional editing process which contains only a beginning and end. What is recorded into the master program media during a job is referred to as a program segment.

Prior to performing a job, the editor, through the work station 20, defines each event which is to occur during the job. Defining an event comprises setting the program time for the event, and what action takes place at the event. Each event is entered into an event list stored in the computer's memory. The computer stores a detailed list of the sources used to create each program segment which may include previous program segment.

The software utilizes a novel system of memory organization and control called the "video cache." The memory 24 of the video sequence recorder 14 is divided into two segments or caches representing program time of ten to thirty seconds each. At least one cache is always in play mode, while the other cache may be in record mode. When source material is recorded from a source into the program, it is simultaneously recorded into the record segment of the cache. The cache operates in a "wrap around" fashion, the current record cache always holding the last twelve seconds of the last program segment recorded on the program tape plus a few seconds of post-roll time to allow transitions at the end of the last recorded segment. Since most transitions take only a few seconds of program time, a ten second cache allocation is almost always sufficient.

After the first job is completed, the caches are flopped so that the record cache becomes the play back cache and the play back cache becomes the record cache. During any subsequent job when new source material is added to the program, the last program segment recorded is played back synchronously and automatically with the program tape. In this manner, the last program segment is always available as source material to which additional material may be added in layers using the mix/keyer 24.

The operation of the post production system can be explained by reference to conventional editing procedures. A frequently encountered type of edit is a dissolve in which one scene fades out while the new scene fade-ins. In this case, the first scene from the source video tape recorder is digitized in the video sequence recorder 14 and passed through, digitally, to the record video tape recorder. Simultaneously with the pass-through of video, the video sequence recorder 14 simultaneously records the scene in the current record segment of the cache.

When it is desired to make a dissolve from the first scene to a second scene, the incoming scene is located on the source video tape recorder 14. The dissolve is made using the video sequence recorder's internal mix/keyer 22 between the previously recorded program segment stored in what is now the play back segment of the cache and the new scene originating from the source tape. The transition and the new scene is recorded in the record segment of the cache and on the program tape simultaneously. When it is not, the system can reload scenes from the program tape back into memory as will be hereinafter described. It should be noted that anytime a layer is added to pre-existing program elements, the portion of the previous program segment corresponding to the transition is overwritten by the new program segment.

A preview mode allows the user to see the transition without committing it to memory or to tape. When the editor is satisfied with the job, the computer automatically performs the job executing the events in the sequence set forth by the editor and recording the new program segment into the program media.

Because the memory is divided into two caches, the system allows for one level of "re-do" without having to reload or relocate the original source material. For unlimited "undo" and "re-do", the post production system uses the archive video tape recorder 46. The archive video tape recorder 46 stores each program segment as it is being recorded onto the program tape in a unique location on the archive media so that the previous program segments are not overwritten by subsequent program segments. In the program media, each successive layer or addition overwrites the previous layer. The archive video tape recorder keeps each program segment or layer intact through the post production process so that it can later be retrieved from tape to memory with no loss in signal quality should changes become necessary. The computer 20 keeps track of the location of each program segment in the archive media 50. The editor can later retrieve any intermediate element in the program to use as source material.

The archive video tape recorder 46 may also be used as a source for assembly of programs into a finished program. These, in turn, can be assembled into larger and larger units until the master program is complete. In this way, post production no longer has to a linear start to finish process, but may take on more of free-form cut and paste characteristics of film editing.

Figure 2:
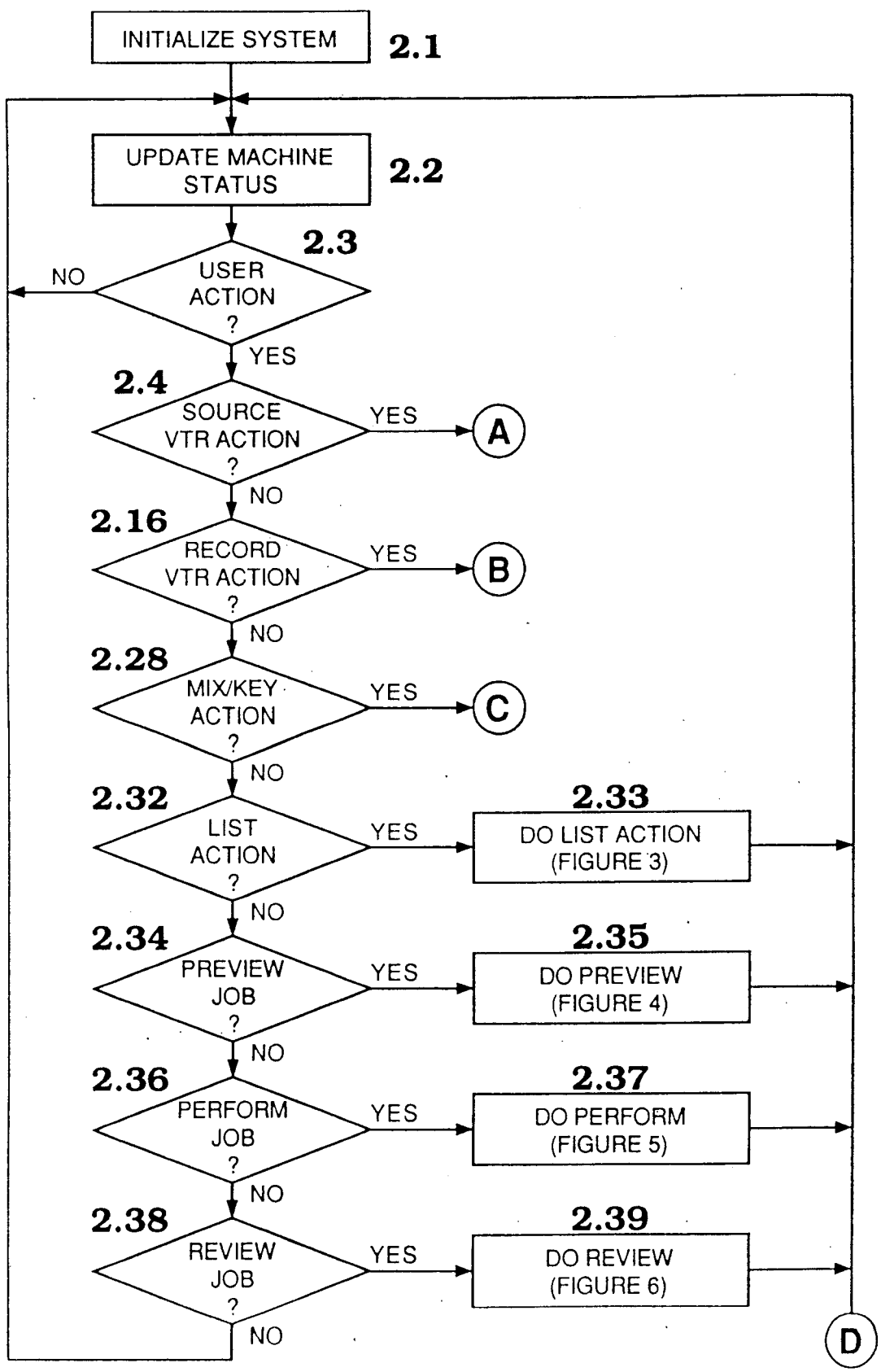
FIG. 2 is a flow chart of the control software.
Figure 2:
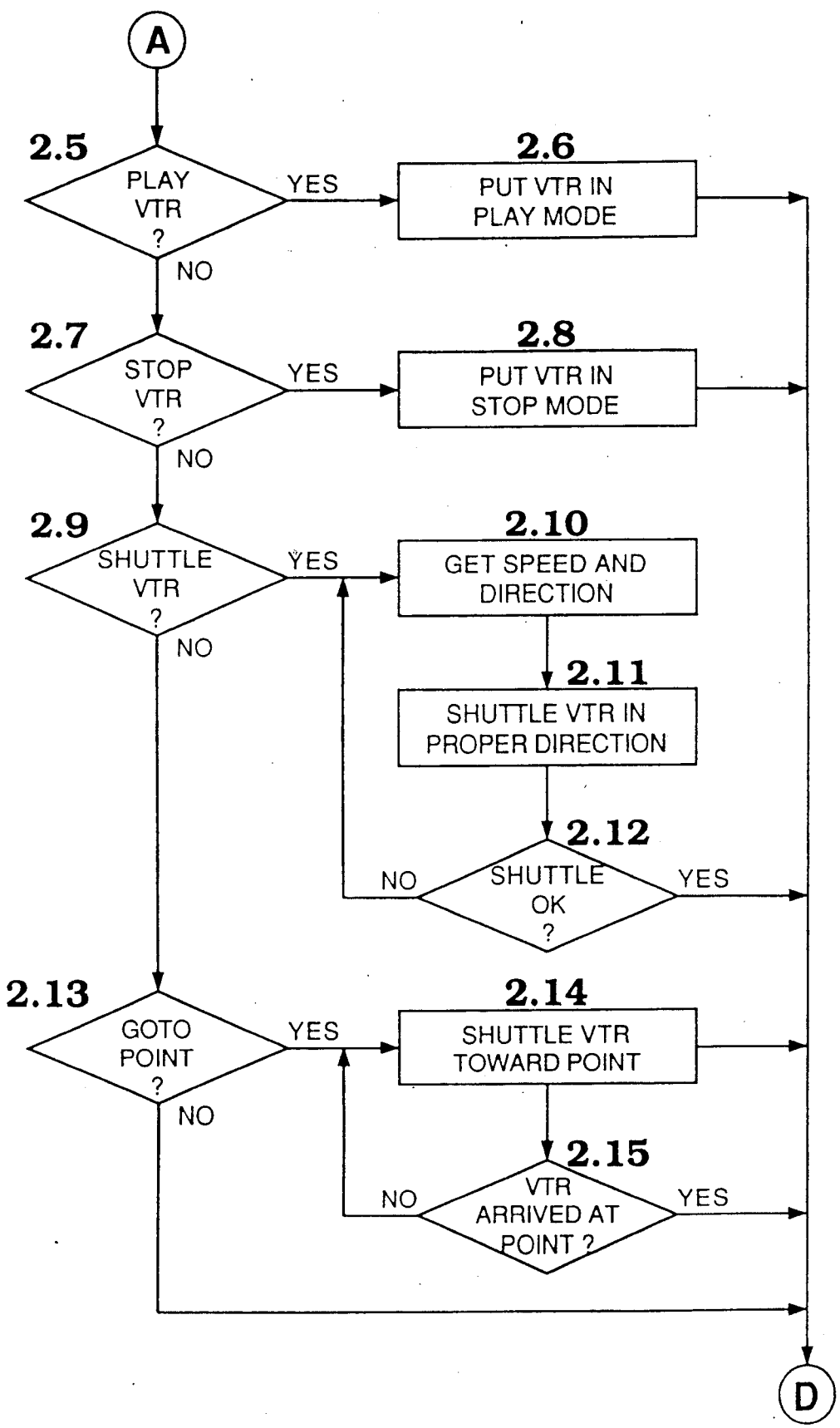
Figure 2:
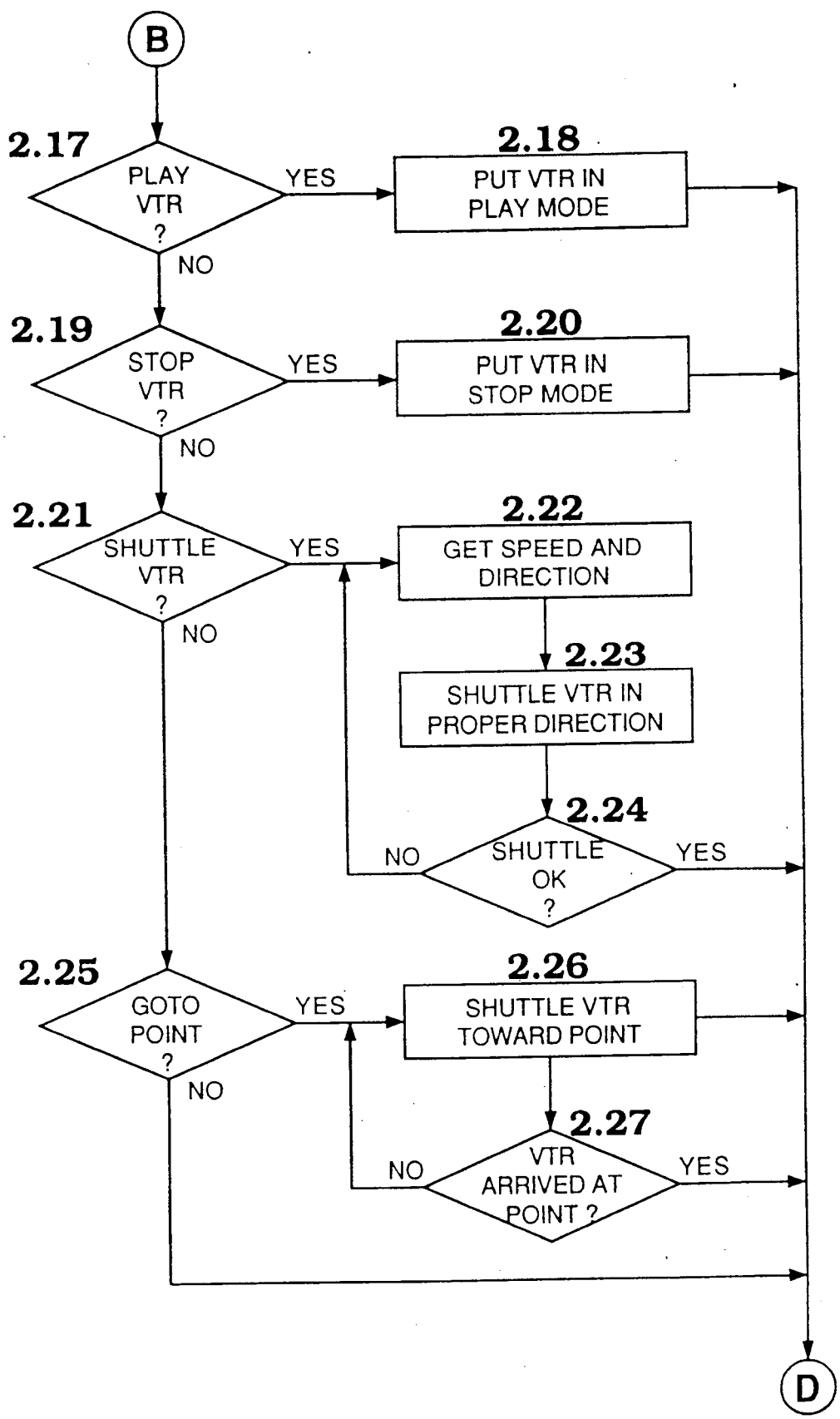
Figure 2:
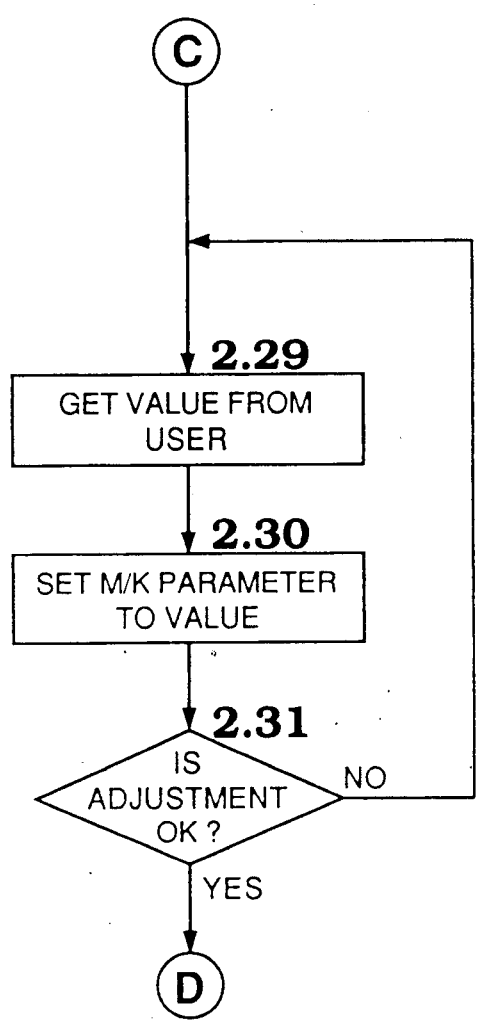

Referring now to FIG. 2, a flow diagram of the control software is illustrated. Upon start-up, the computer 20 initializes the system (2.1) and then updates the status of each source machine and destination machine (2.2). During the process of updating machine status, the computer performs such tasks as reading the time code from each source video tape recorder and record video tape recorder, checking the machine status (i.e. play or record) and updating numbers on the display screen. After updating machine status, the computer waits for an operator command (2.3). The commands include source video tape recorder action commands (2.4), record video tape recorder action commands (2.16), mix/key action commands (2.28), list action commands (2.32), preview job commands (2.34), perform job commands (2.36) and review job commands (2.38).

The source video tape recorder action commands and record video tape recorder commands include play (2.5, 2.17), stop (2.7, 2.19), shuttle (2.9, 2.21) and go to (2.13, 2.25), and allow the operator to manually control the source video tape recorder. The computer issues necessary command signals to the source video tape recorder to execute the commands.

For instance, if the computer detects a command to play the video tape recorder (2.5, 2.17) it places the source or record video tape recorder in play mode (2.6, 2.18). Similarly, upon detecting a stop video tape recorder command (2.7, 2.19) the computer 20 puts the source or record video tape recorder in stop mode (2.8, 2.20). If the computer detects a shuttle video tape recorder command (2.9, 2.21), it fetches the speed and direction from the operator (2.10, 2.22) and shuttles the video tape recorder in the proper direction (2.11, 2.23). The computer continues to shuttle until the operator indicates that the shuttle is complete (2.12, 2.24) and then returns back to the main event loop. In the case of a "go to" command (2.13, 2.25), the computer shuttles the video tape recorder towards the indicated point (2.14, 2.26). When the video tape recorder arrives at the designated point (2.15, 2.27), the computer stops shuttling and returns back to the main event loop.

The mix/key action command allows the operator to set the mix/key parameters to values provided by the user. The operator inputs values for each parameter using the computer keyboard, mouse or other input device while observing the mix/keyer output on the monitor. The computer retrieves the input value (2.29) and automatically sets the mix/key parameters (2.30) before returning to the main event loop. Using the mix/key action command the operator can independently adjust key slice, gain, phase and opacity.

Figure 3:
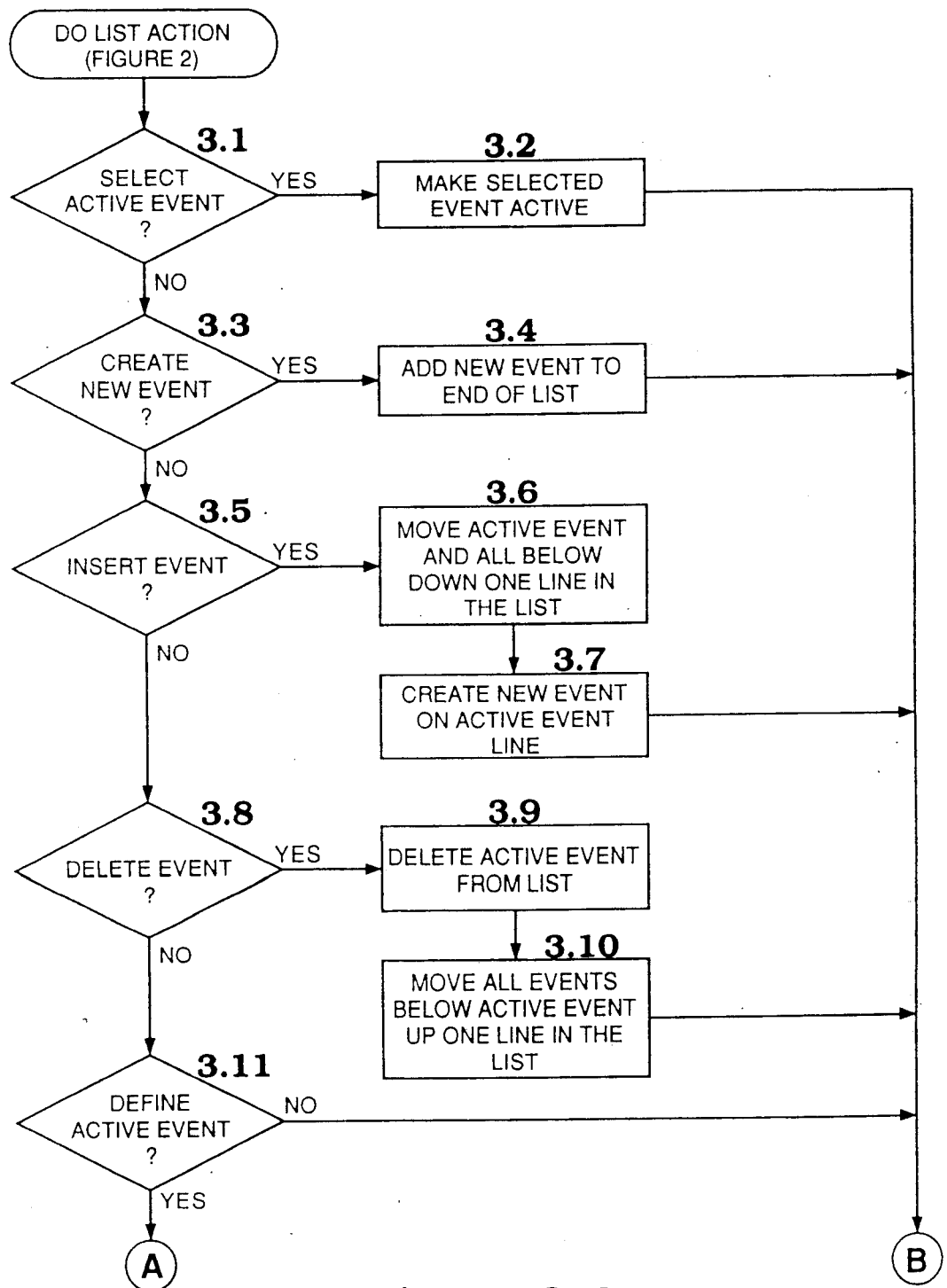
FIG. 3 is a flow chart of the list action loop of the control software.
Figure 3:
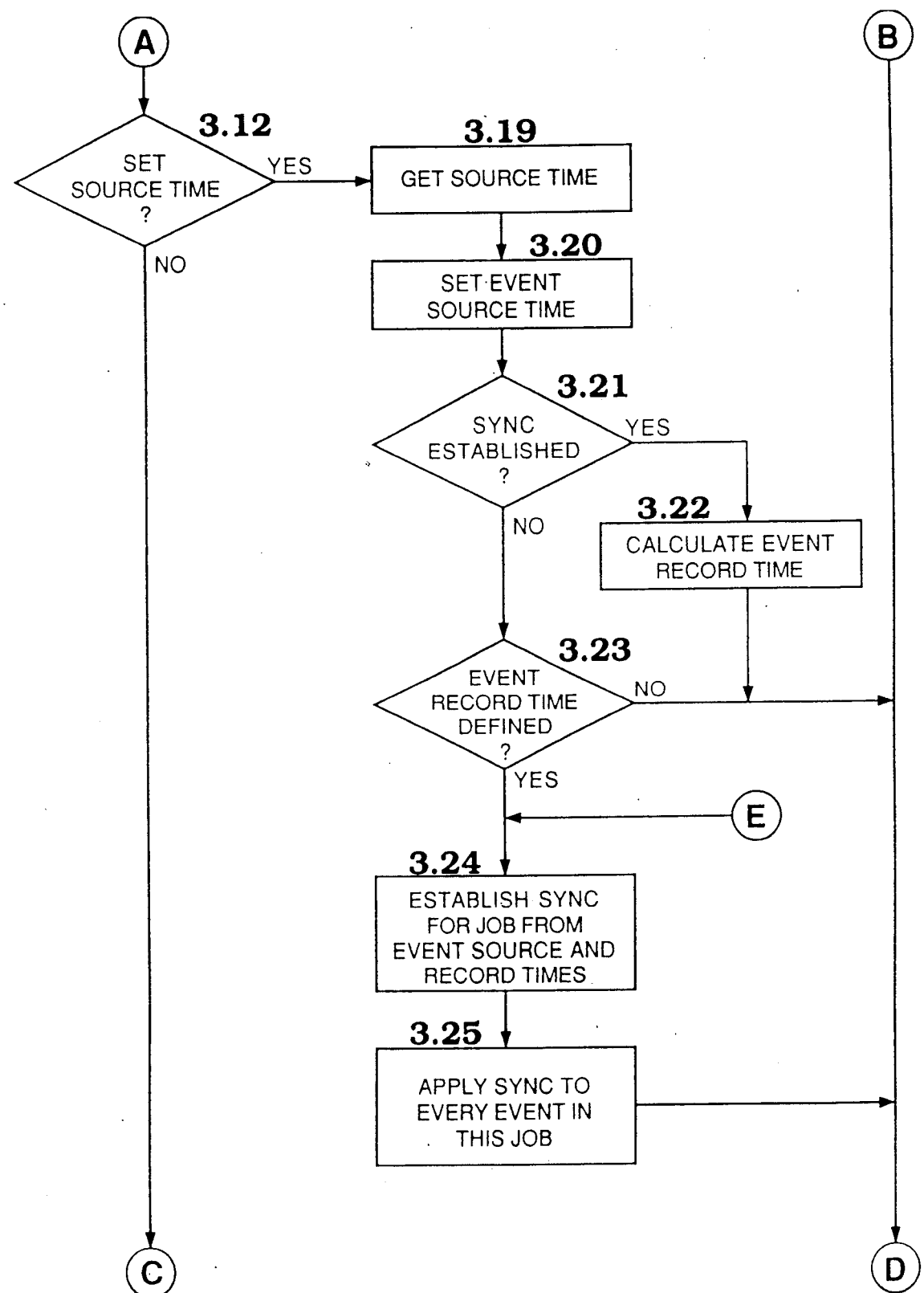
Figure 3:
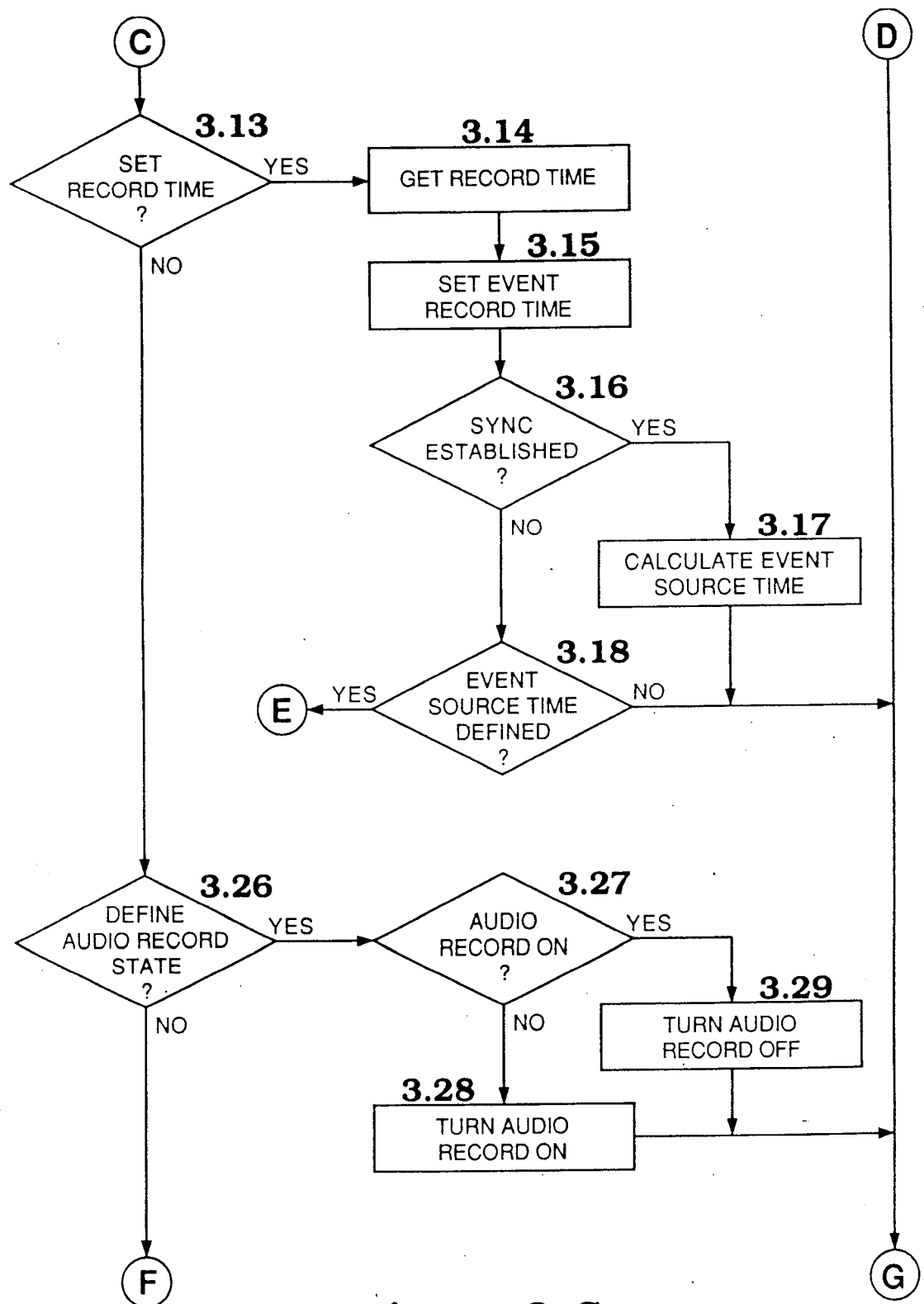
Figure 3:
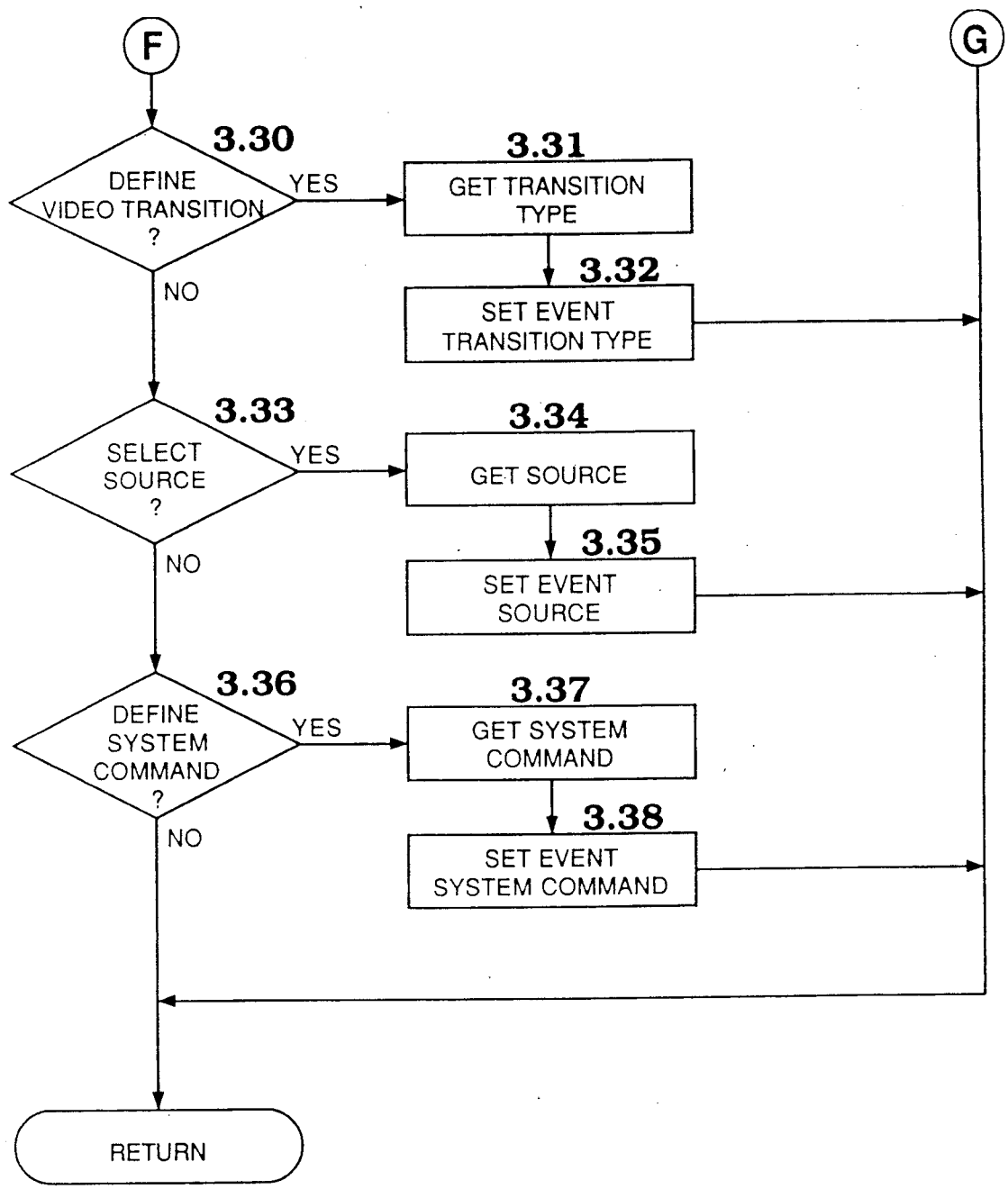

When a list action command is detected the computer enters the list action command loop (2.32) and executes the command (2.33). The list action command loop is shown in more detail in FIG. 3. The list action commands let the operator create and define events for a given job. The list action commands include the create event command (3.3), insert event command (3.5), delete event command (3.8), select active event command (3.1) and define active event command (3.11). The create event command is an instruction to the computer to add a new event to the event list (3.4) for the current job. For instance, if the event list includes five events, the create event command would add a sixth event to the end of the list. The select active event command (3.1) allows the operator to designate one of the events in the event list for the current job as the active event. It should be appreciated that there is only one active event at any given time. When the operator selects an event to be made active, the previous active event is made inactive and the selected event is made active (3.2). The insert event command allows the operator to insert an event into the event list. When the insert event command is given, a new event is created in the position of the active event (3.6). The active event and each subsequent event is moved down one place on the event list (3.7) for the current job. The delete event command deletes the active event from the event list (3.9) and moves all events below the active event up one line on the event list (3.10). It should be appreciated that the create event command, insert event command and delete event command, all create events without defining a time or action for the event.

The define active event command enables the operator to define the time and action which occurs at each event. More particularly, the define active event commands allow the operator to define when the event is to occur in either source time or record time. Also, the operator can define what action or actions occur at the event.

To set the record time for an event, the operator enters the record time, using any one of the standard input devices. The computer automatically sets the event record time (3.15) and determines whether a sync relationship between the source video tape recorder and the program video tape recorder has been established (3.16). If so, the source time for the event is calculated and set (3.17). If no sync relationship is established, the computer checks to see whether the source time for the active event has already been defined (3.18). If so, the computer establishes the sync relationship for the job (3.24) from the event source and record times for the active event. When the sync relationship is established for the job, it is applied to the active event and every other event in the job (3.25) for which a record time or source time has already been established.

The source time is set in the same manner. The operator enters the record time (3.19) for the event which is then set automatically by the microprocessor (3.20). If a sync relationship is established (3.21), the computer calculates and sets the event record time (3.22). If no sync relationship is established, the computer checks to see whether a record time has been defined for the active event (3.23) and if so, establishes a sync relationship for the job (3.24). The calculated sync relationship is then applied to every event in the job as previously described (3.25). If no sync relationship has been established and no record time has been entered for the active event, the computer returns to the beginning of the list action loop.

In the embodiment shown, the possible actions include a change in audio record state, a video transition, a source selection, or a system command. The define audio record state command allows the operator to toggle the audio record state between "on" and "off" status. For instance, if the audio record is on (3.27), the computer turns it off (3.29). If it is off, the audio record is turned on (3.28). In either case, the computer returns to the beginning of the list action loop.

The define video transition command allows the operator to select a video transition, and, if necessary, to select a duration for the transition. The video transition selected may include cuts, dissolves, cut key ins, dissolve key ins, dissolve key outs, wipes and digital moves. Certain video transitions, such as cuts and cut key ins, occur instantaneously and therefore have no duration. Other video transitions, such as dissolves, wipes and digital moves have a finite duration. For these video transitions, the operator must also select a duration for the transition, which selection may occur by default. The operator must also select a new source or sources for the video transition. For instance, if the video transition comprises a cut from source A to source B, the operator selects source B as the new source. The computer retrieves the designated source (3.34) and sets the event source (3.35) to be performed.

A system command could, for example, be an instruction to initiate a general purpose contact closure through which various components of the system are controlled. The computer automatically gets the system command (3.37) and set the event system command (3.38).

In defining an active event, the operator must set the time on the record video tape recorder 44 at which the event is to occur (i.e. set source time) and may set the time on the source video tape recorder 54 (i.e. record time) at which the event is to occur. In some instances, either the source time or program time will be calculated and set automatically. This occurs whenever a sync relationship between the source video tape recorder and program video tape recorder is established.

Figure 4:
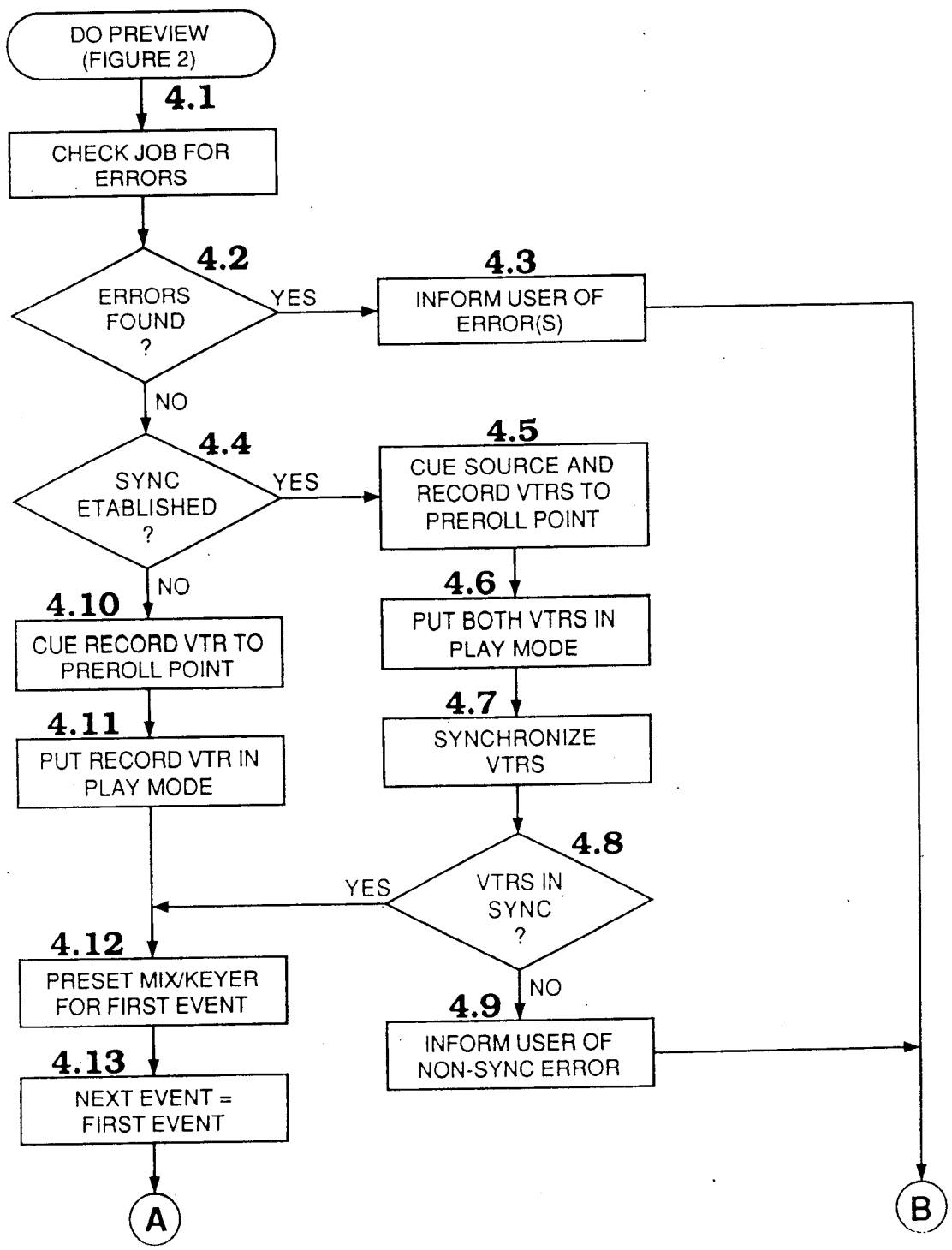
FIG. 4 is a flow chart of the preview job loop of the control software.
Figure 4:
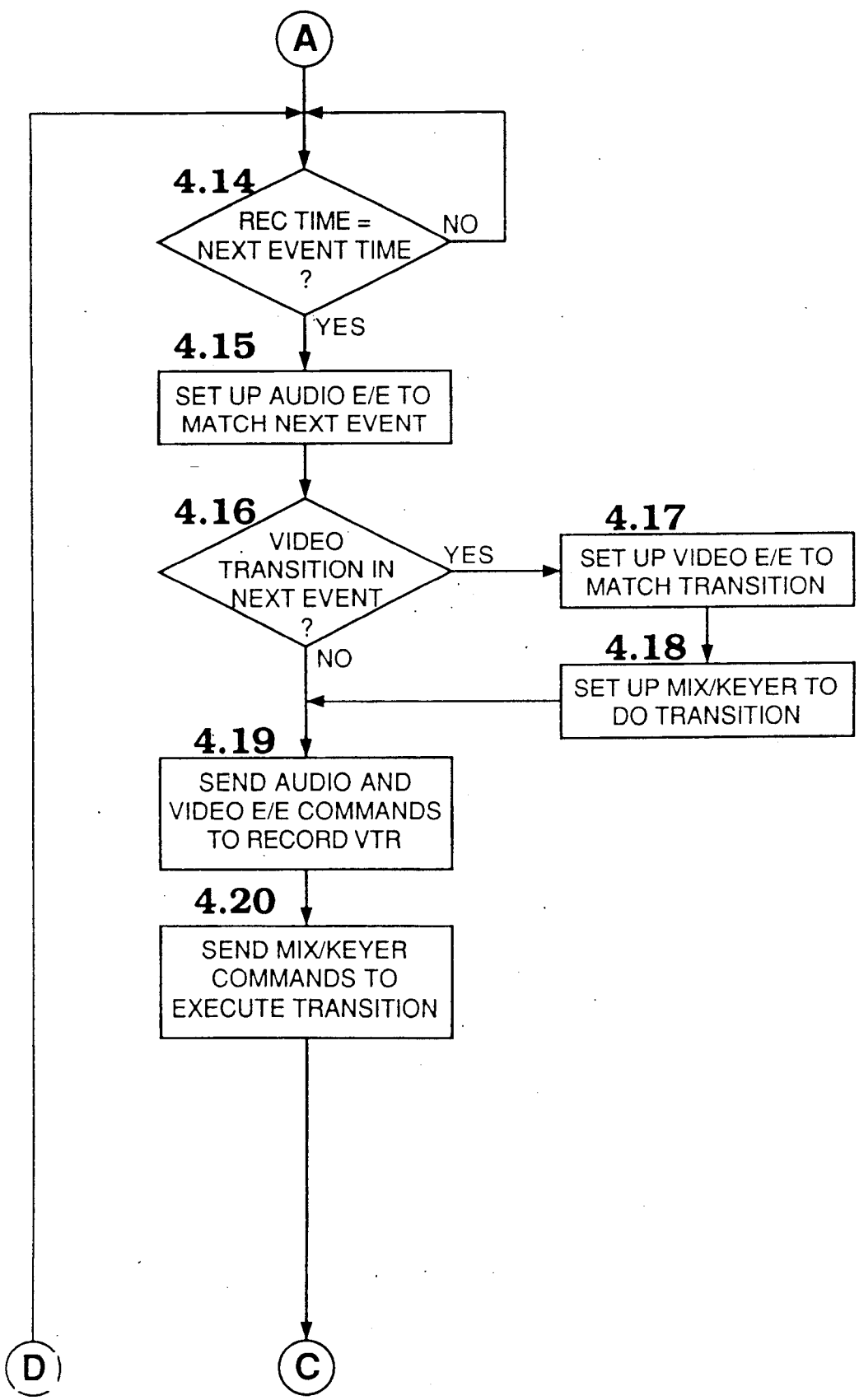
Figure 4:
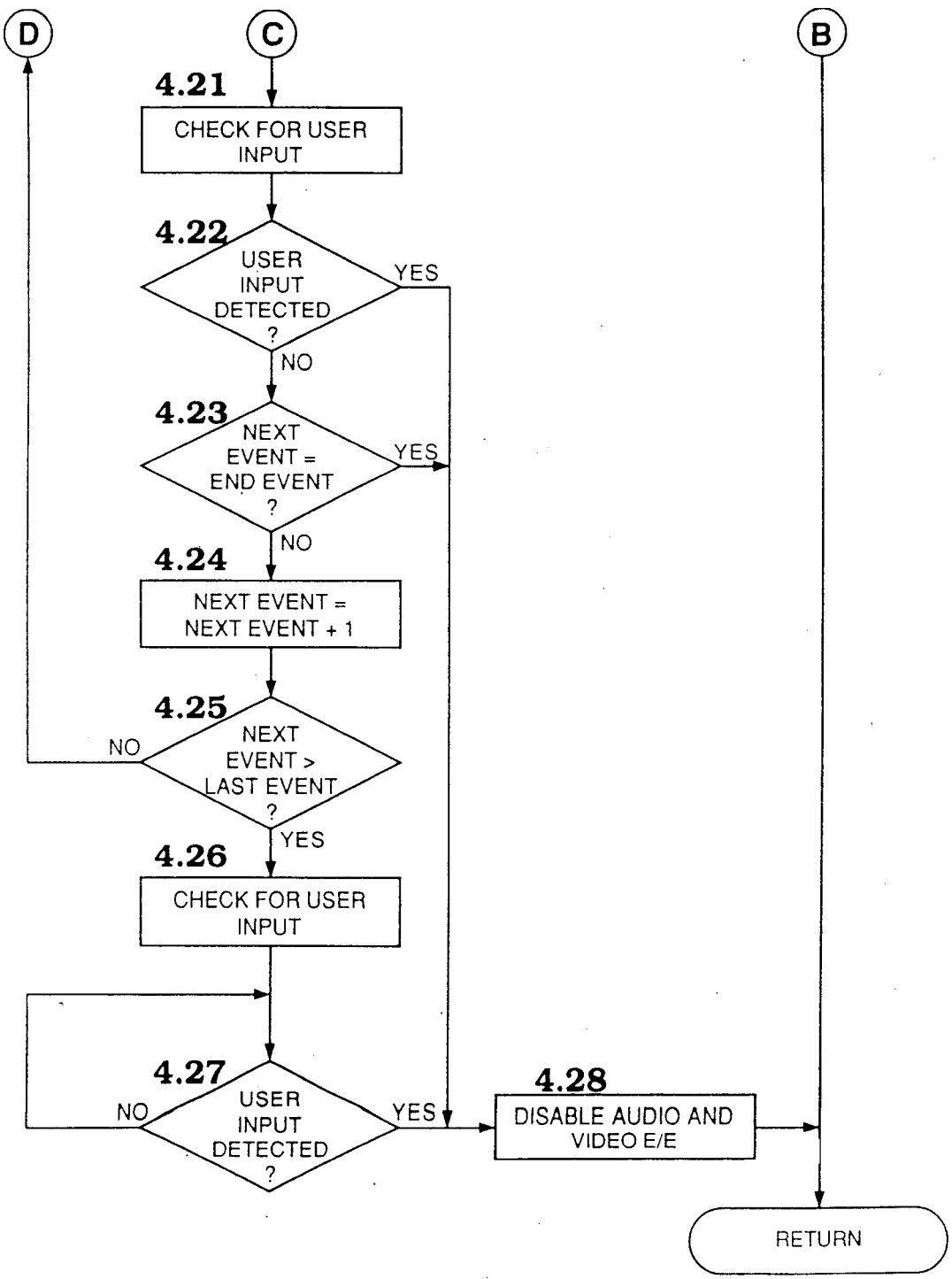

The preview job command places the system in the preview job loop shown in FIG. 4 and allows the operator to preview the job. Upon entering the preview job loop, the computer checks the current job for errors (4.1). For example, program and source times for different events may be out of sequence. If the computer finds an error (4.2) or "illegal" event, an error message is displayed on the monitor to inform the user of the error (4.3) and the computer returns to the beginning of the previous job loop. The operator can then go back into the list action loop to redefine events to correct the error.

If no errors are found, the computer checks to determine whether a sync relationship has been established (4.4) between the source video tape recorder and the record video tape recorder. It so, the computer cues the source and program video tape recorder's to the pre-roll point (4.5), places them in the play mode (4.6). The computer synchronizes the video tape recorders (4.7). If synchronization cannot be established, the computer informs the user of a non-sync error (4.9) and returns to the beginning of the main event loop. If the video tape recorder's are synchronized, the computer continues to execute the preview job.

In some instances, there is no need for establishing a sync relationship between a source and record video tape recorder. For instance, many sources provide non-moving visual images which do not need to be synchronized with the program tape. Such sources might include a title camera, test generator or character generator. Also, a "still store" may be used as a source. In these cases when there is no sync relationship between the source and program, the computer cues only the record video tape recorder to the pre-roll point (4.10) and places the record video tape recorder in play mode (4.11).

Once the record video tape recorder is in the play mode, the computer sets the mix/keyer 24 for the first event in the event list for the current job. The computer 20 then sets the variable, NEXT EVENT, equal to the first event in the current job (4.13). The computer then enters a quiescent state until the actual record time on the record video tape recorder 44 equals the record time which was defined for NEXT EVENT (which at this point is the first event). When the actual record time equals the NEXT EVENT record time (4.14), the computer sets up the audio E/E to match the NEXT EVENT (4.15) and checks to see whether a video transition occurs in the NEXT EVENT (4.16). If a video transition is in the NEXT EVENT, the computer sets up the video E/E to match the defined transition (4.17) and sets up the mix/keyer to perform the transition (4.18). In either case the computer sends audio and video E/E commands (4.19) to the record video tape recorder and mix/keyer commands to the video sequence recorder 14 (4.20) to execute the transition. At this point, the operator can abort from the preview. The computer checks for user input (4.21). If no user input is detected (4.22), the computer determines whether the NEXT EVENT equals the end event (4.23) and if so disables the audio and video E/E (4.28). The operator can define any event as an end event, or may not define an end event. If the NEXT EVENT does not equal the end event, the computer increments the NEXT EVENT (4.24) and determines whether the new value for NEXT EVENT is greater than the last defined event in the job (4.25). If so, the record and source video tape recorder continue to operate until the computer detects user input (4.26), at which time the computer disables the audio and video E/E (4.28). This situation might occur when the operator leaves the job open-ended and terminates the preview "on the fly." It is understood, therefore, that the last defined event for the current job is not necessarily an end event. If the NEXT EVENT is not greater than the last event defined for the current job, then the computer waits until the actual record time to equal the record time for the NEXT EVENT (4.14) and then executes the NEXT EVENT as previously described. The computer continues to execute events sequentially in this manner until an end event occurs (4.23), or until the user aborts (4.21, 4.26), at which time the computer 20 disables audio/video E/E (4.28).

After executing the perform job, the computer 20 returns back to the main event loop. If the operator wishes to make changes before committing the job to the program tape, he can instruct the computer 20 to return to the list action command loop to edit the event list. If the operator is satisfied with the job as previously defined, he can instruct the computer to perform the job (2.36).

Figure 5:
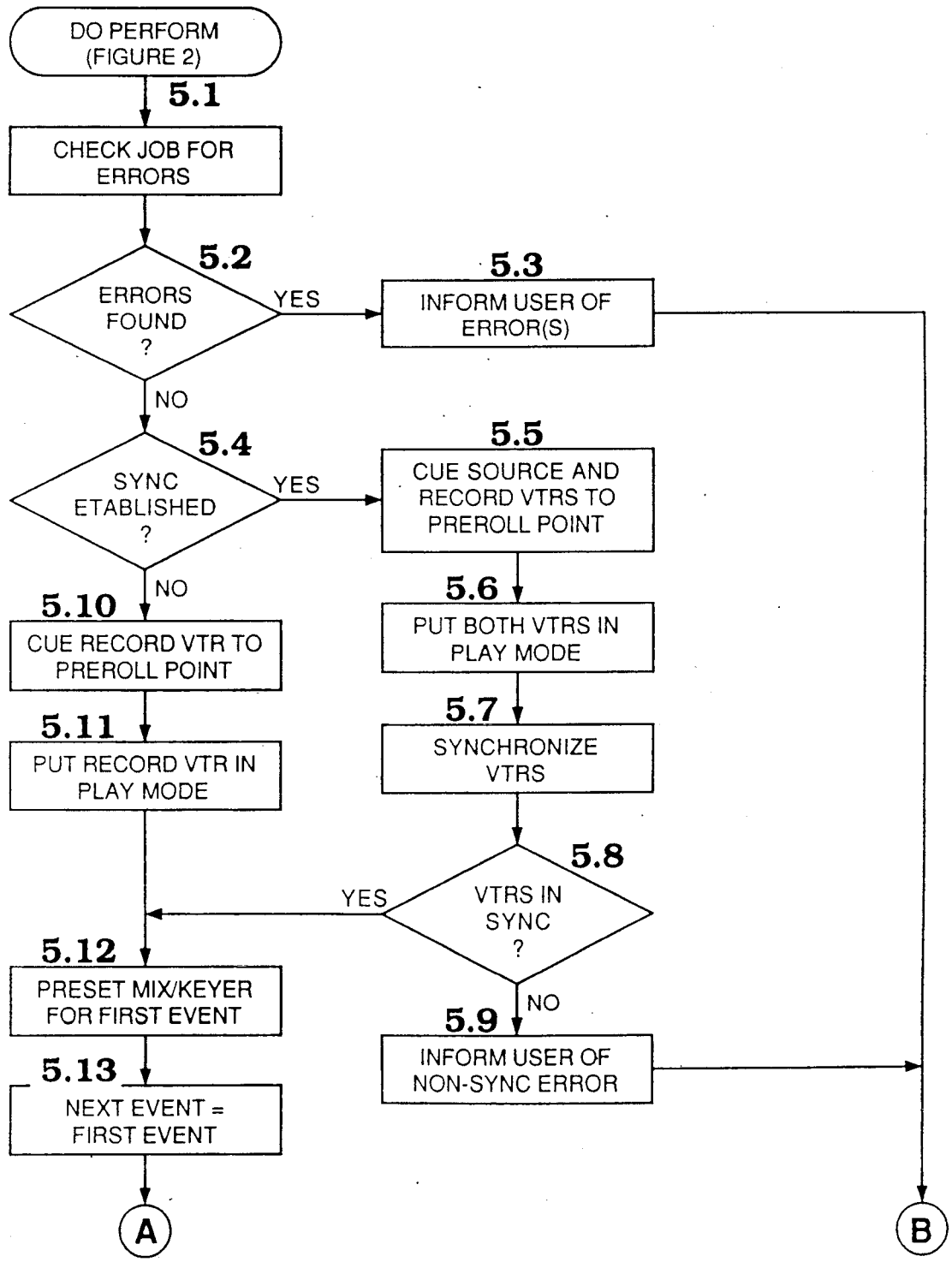
FIG. 5 is a flow chart of the perform job loop of the control software.
Figure 5:
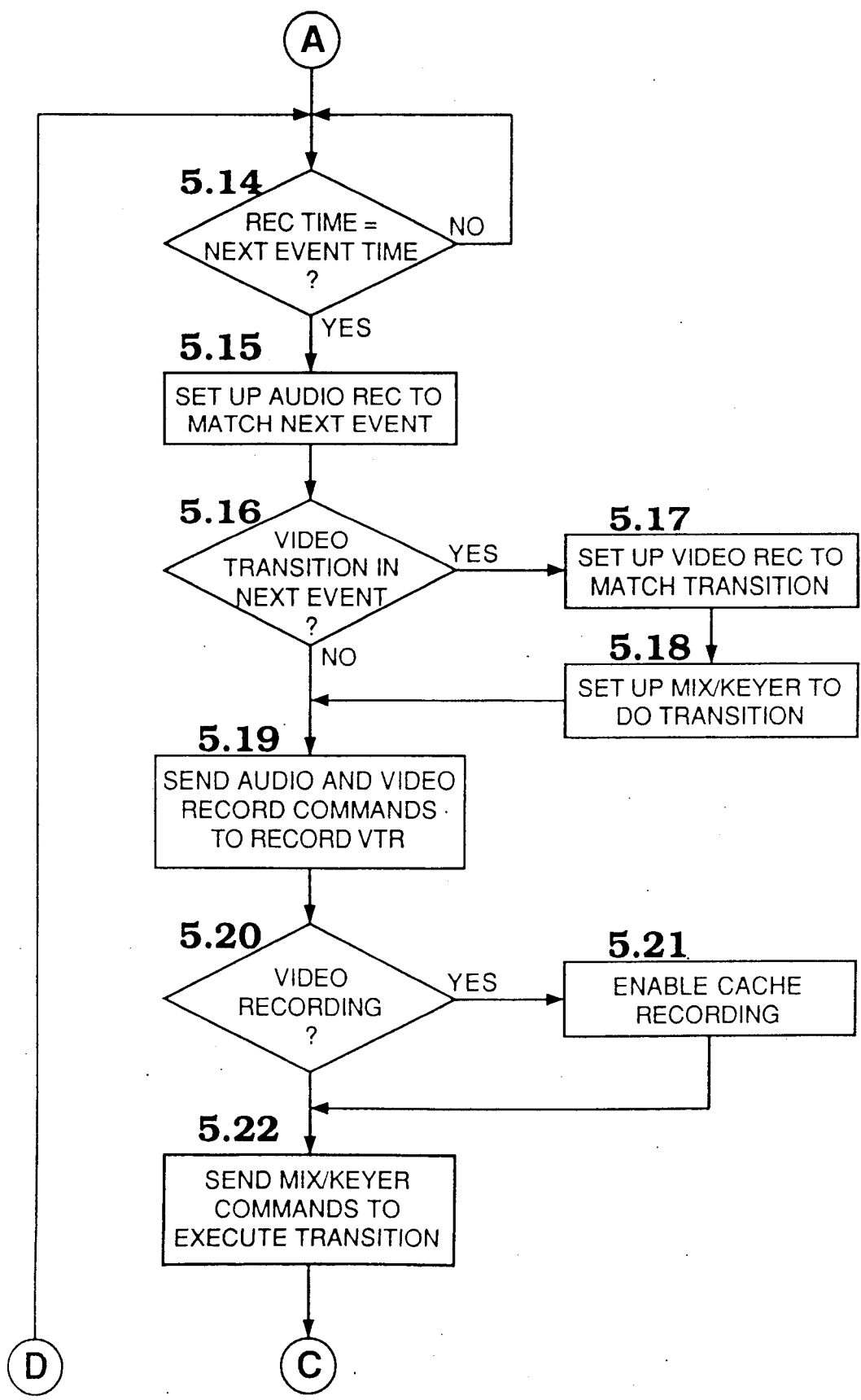
Figure 5:
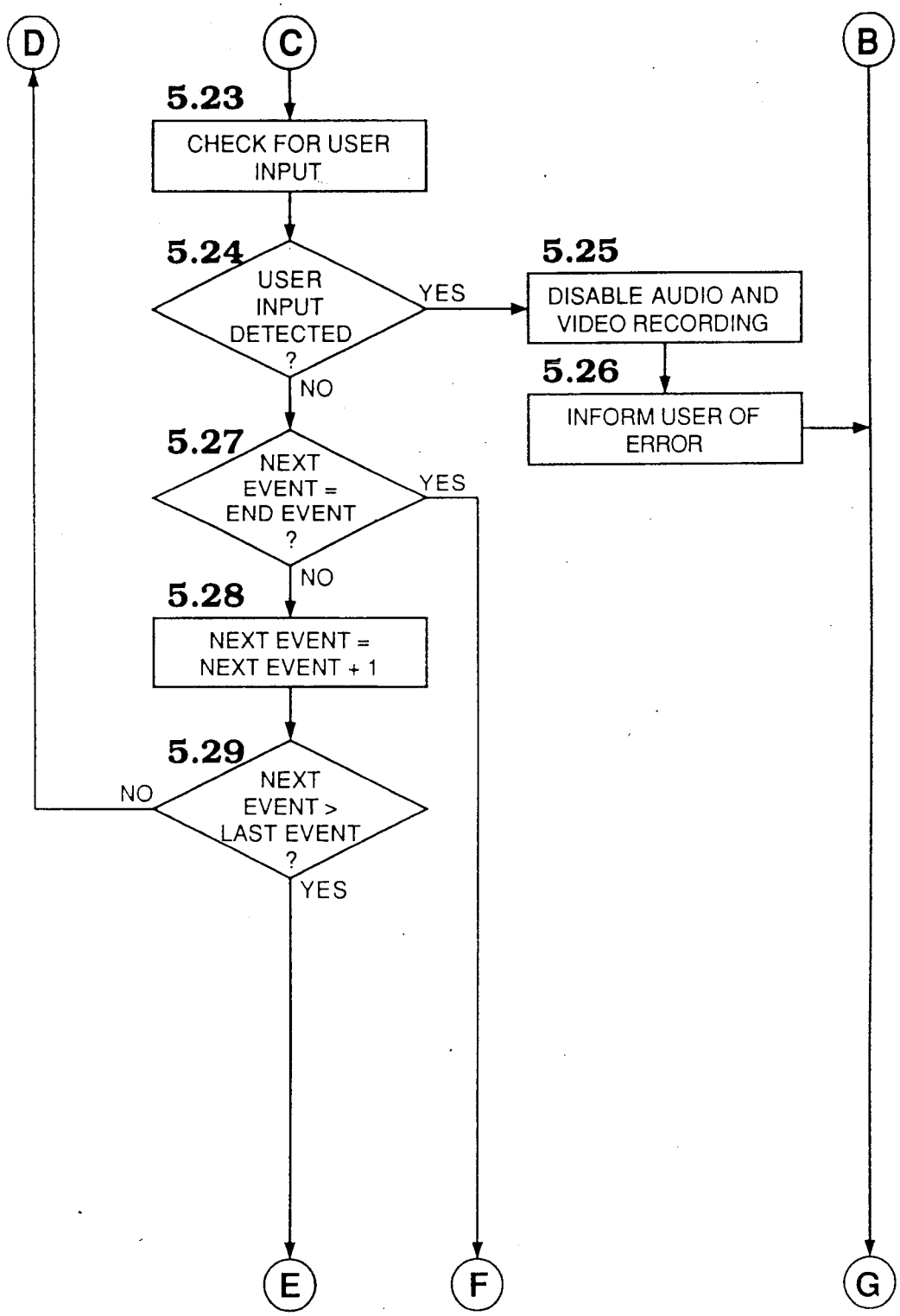
Figure 5:
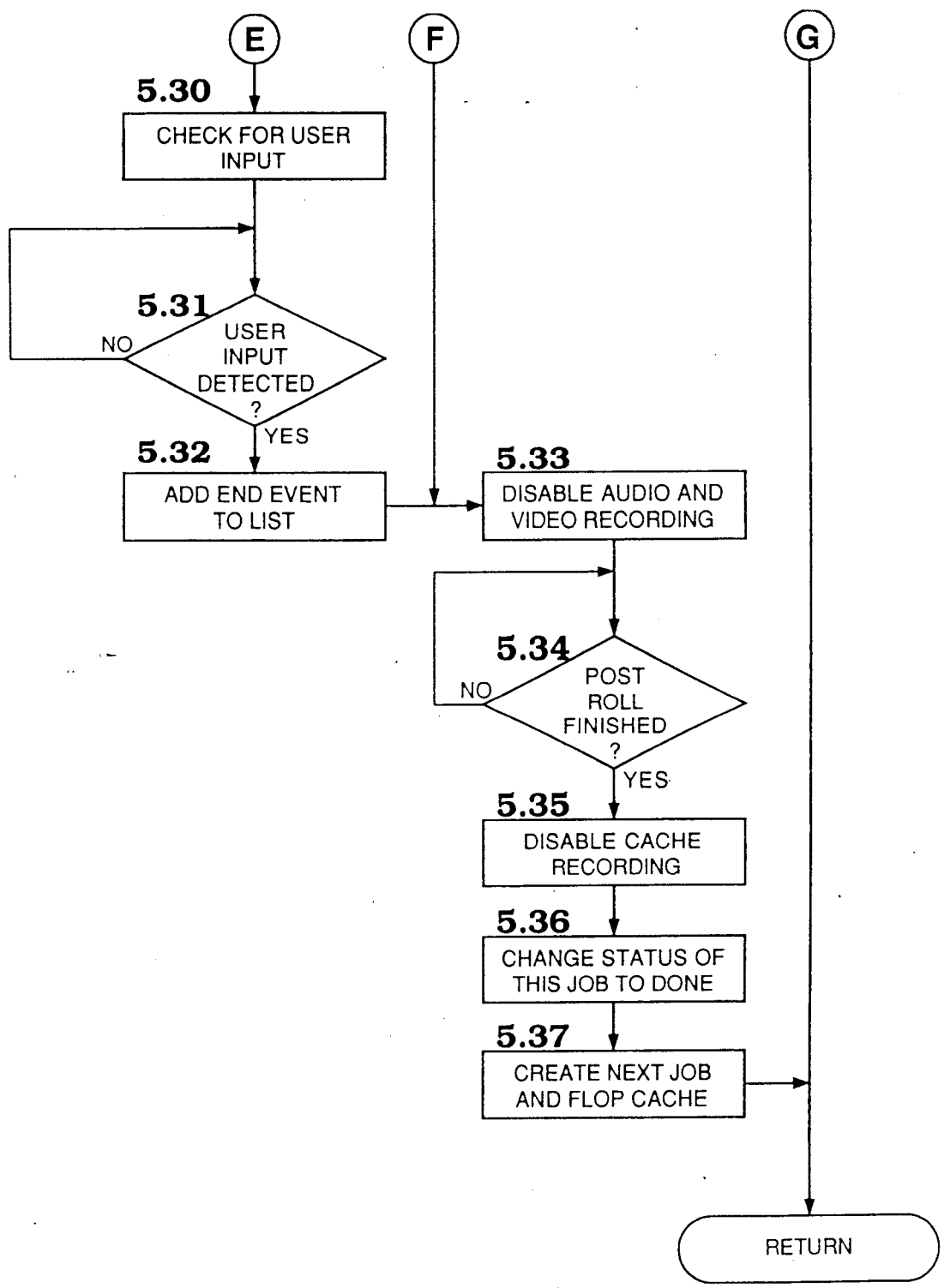

Referring now to FIG. 5, a flow diagram for the perform job loop is illustrated. In the perform job loop the computer 20 checks the job for errors (5.1) and, if any are found, displays an error message to inform the operator (5.3). If no errors are found and synchronization is established, the computer 20 cues the source and video tape recorder's to the pre-roll point (5.5), and places the source and record video tape recorder's in play mode (5.6). The source and record video tape recorders are synchronized (5.7). If synchronization of the video tape recorder's is not established, the user is informed of the non-sync error (5.4) and the computer 20 returns to the beginning of the perform job loop. As previously described, some jobs do not require that a sync relationship be established between the source and the program tape. In these cases, the computer cues only the record video tape recorder (5.10) and puts it in play mode (5.11). Once the record video tape recorder's are in play mode, the computer 20 presets the mix/keyer 24 for the first event defined for the job (5.12) and sets NEXT EVENT equal to the first event (5.13). The computer 20 then waits (5.14) until the actual record time on the record video tape recorder is equal to the record time for the NEXT EVENT (which is equal to the first event). The computer 20 then sets up the audio record state to match the NEXT EVENT (5.15) and determines whether a video transition occurs in the NEXT EVENT (5.16). If so, the computer 20 sets up the video record state to match the defined video transition (5.17) and sets up the mix/keyer to perform the transition (5.18). In either case, the computer 20 sends audio/video record commands to the record video tape recorder (5.19). After the command signals are sent to the record video tape recorder, the computer 20 monitors the record video tape recorder. When video recording is detected (5.20), the microprocessor sends a command to the video sequence recorder to begin recording in the record segment of the video cache (5.21). Thus, what is recorded on the record video tape recorder is simultaneously recorded in the record segment of the video cache. When the event includes a video transition, mix/keyer commands are sent to the mix/keyer 22 to execute the transition. If the record video tape recorder is not in the record state (5.20), cache recording is disabled and mix/keyer commands, if any, are sent to the mix/keyer (5.22). At this point, the operator has the option of aborting the perform job. The computer checks for user input (5.23). If user input is detected (5.24), audio/video recording is disabled (5.25) and the user is informed of a record error (5.26). If no user input is detected, the computer determines whether NEXT EVENT is the end event (5.27). If NEXT EVENT does not equal the end event, the computer increments NEXT EVENT (5.28) and then determines whether the new value of NEXT EVENT is greater than the last event defined for the current job (5.29). If the NEXT EVENT is not greater than the last event, the computer 20 waits until the actual record time on the record video tape recorder equals the record time for NEXT EVENT (5.14). Each event is performed in this manner until an end event is detected (5.27), or until user input is detected. If the end event is not defined, the user may abort after the last event. The computer 20 checks for user input (5.30). When user input is detected, an end event is added to the event list (5.32). Whether the end event is predefined or defined "on-the-fly" the audio/video recording is disabled (5.33). After completion of the post-roll (5.34) the computer disables cache recording (5.35) and changes the status of the current job to done (5.36). The final task is to create a new job and flop the record and play back caches (5.37).

Figure 6:
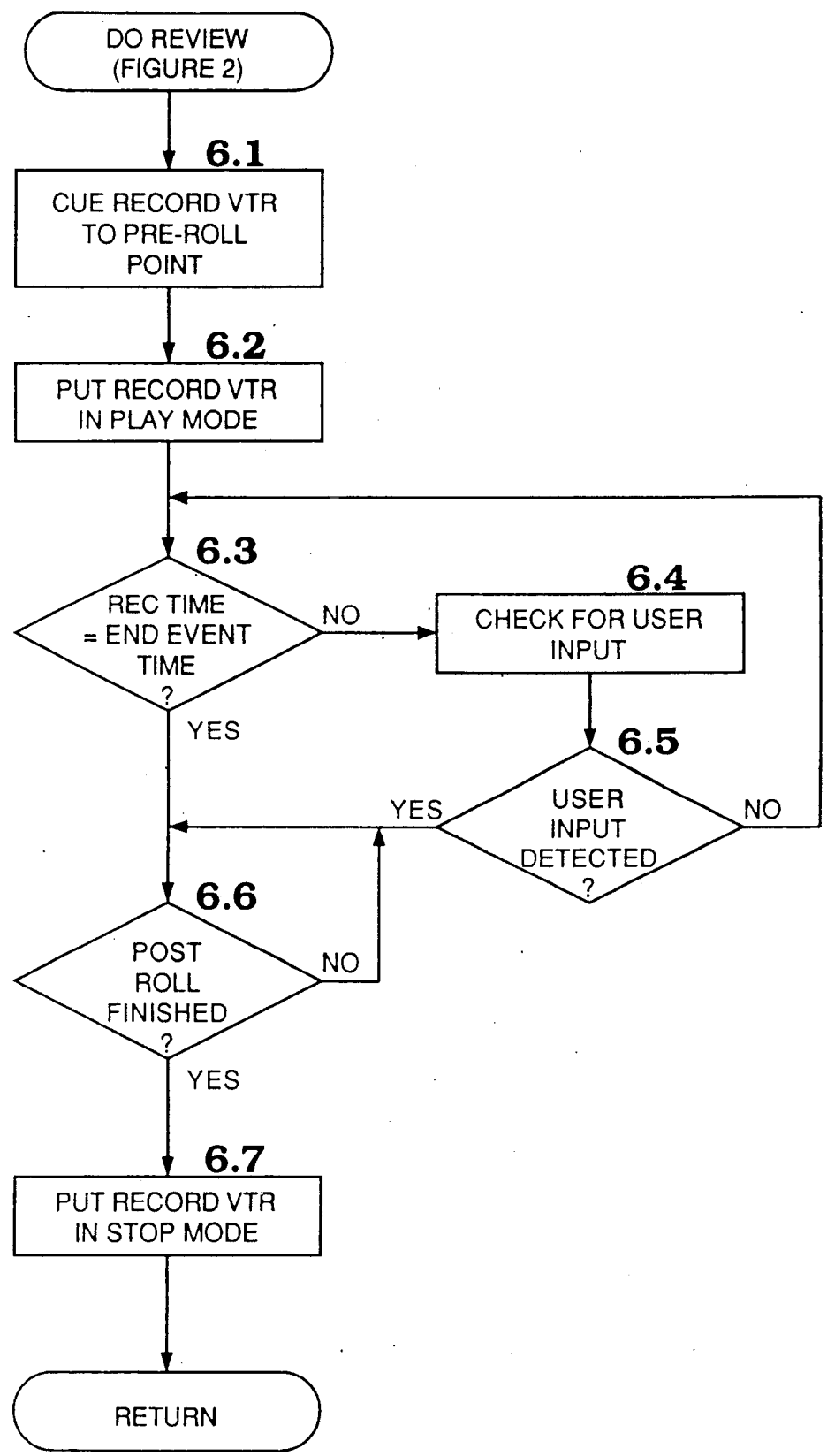
FIG. 6 is a flow chart of the review job loop of the control software.

The review job command allows the operator to review a job after it has been performed. The review job loop is illustrated in FIG. 6. After entering the review job loop, the computer cues the record video tape recorder to the pre-roll point (6.1) and places the record video tape recorder in play mode (6.2). The computer monitors the record video tape recorder time (6.3). The record video tape recorder remains in the play mode until the record video tape recorder time equals the record time for the end event or until user input is detected (6.5). In either case, the computer waits until the post-roll is completed (6.6) and then places the record video tape recorder in stop mode (6.7).

Figure 7:
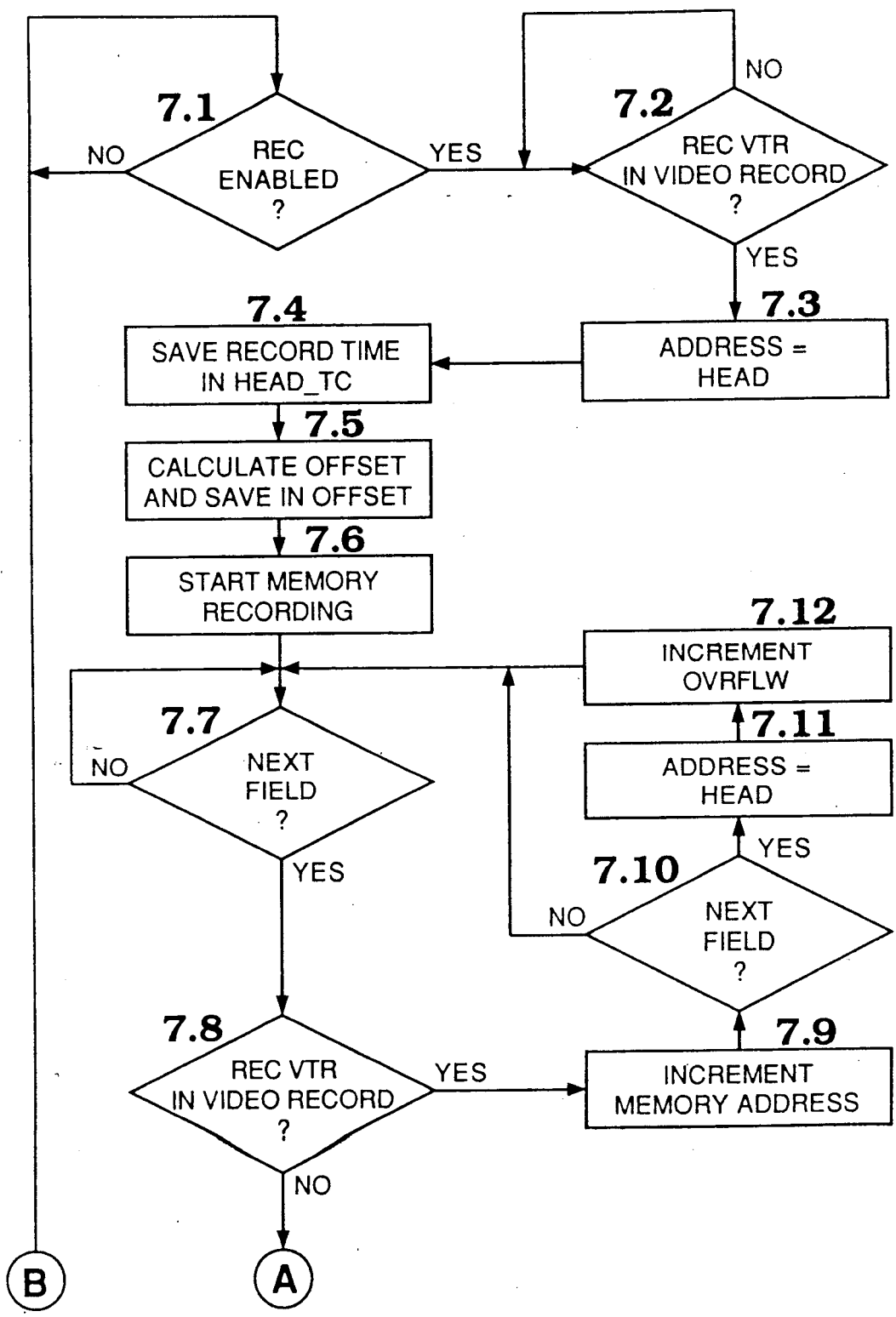
FIG. 7 is a flow diagram of the record cache sub-routine.
Figure 7:
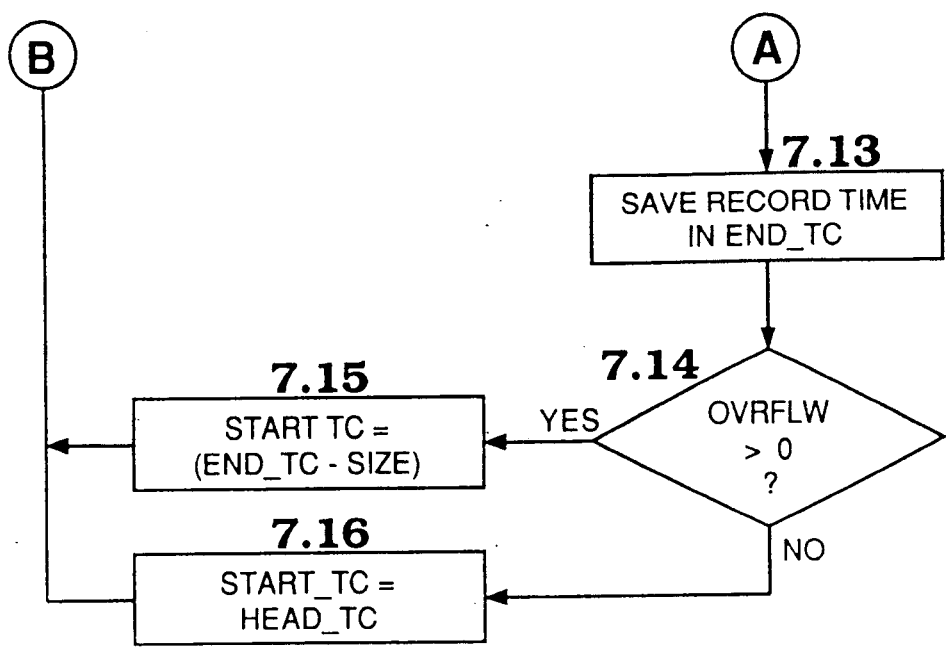
Figure 8:
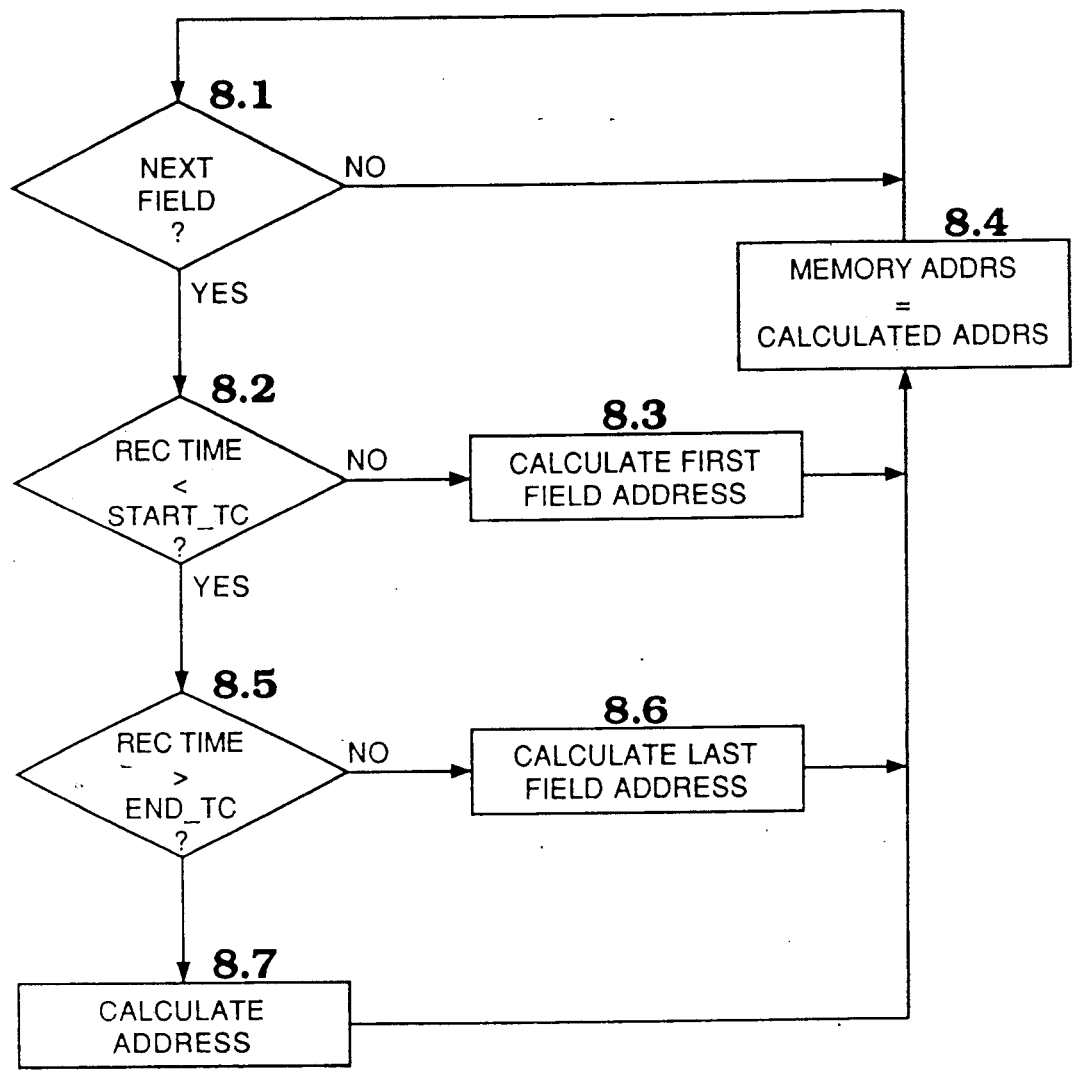
FIG. 8 is a flow diagram of the play back cache sub-routine.

The control software contains two routines to control playback cache operation and record cache operation. Referring first to FIG. 7, a flow diagram is shown for the record cache routine. In order to understand the flow diagram, the video cache data structure needs to be understood. The parameters of the video cache data structure include STAT, HEAD, TAIL, SIZE, OVERFLOW, HEAD TC, OFFSET, END TC, and START TC. The cache status (STAT) may be any one of these modes which are indicated by the numeral 0, 1 and 3. If the cache status is equal to 0, then the cache is off. If the cache status is equal to 1, the cache is in play back mode and if the cache status is equal to 2, the cache is in record mode. HEAD is the memory address of the start of the cache. TAIL is the memory address of the end of the cache. SIZE is the cache size in fields which is essentially the difference between HEAD and TAIL. OVERFLOW is the number of times the cache overflows while it is in record mode. HEAD TC is the record time code when recording started. OFFSET is the difference between HEAD and HEAD TC. END TC is the record time code when recording ended, and START TC is the record time code of the first frame in the cache. When there is no OVERFLOW, START TC is equal to HEAD TC.

Once recording is enabled, the computer monitors the record video tape recorder (7.2). When the record video tape recorder goes into record mode, the computer sets the write address equal to HEAD (7.3). The record video tape recorder time when recording started is stored in HEAD TC (7.4) and, the computer calculates the OFFSET and saves the value in OFFSET (7.5). The current field is written into the record segment of the cache at the current write address (7.6). Recording continues until the computer detects a new interrupt signal indicating the next field (7.7). When the interrupt signal is detected, the computer checks the status of the record video tape recorder (7.8). If the record video tape recorder is still in record mode, the write address is incremented (7.9). The computer checks to determine whether the new write address is greater than TAIL (7.10), which would indicate whether an OVERFLOW condition exits. If so, the write address is set equal to HEAD (7.11) and the OVERFLOW is incremented (7.12). This allows the record segment of the cache to wrap around on itself in the event that the program segment being recorded is larger than the memory allocation for the record segment of the cache. The computer waits for the next interrupt (7.7) and then repeats the process. When the record video is taken out of record mode, the computer saves the end time code on the record video tape recorder (7.13). If OVERFLOW is greater than zero (7.14) the computer sets START TC equal to END TC-SIZE (7.15). If OVERFLOW is not greater than zero then start time code is set equal to HEAD time code (7.16). In any case, execution returns to the top of the loop to wait for another record enable command.

The play back cache routine operates on a field by field basis just as the record cache routine. The computer waits for an interrupt signal (8.1). When an interrupt signal is detected, the computer determines whether the record time as indicated by the time code from the record video tape recorder is less than START TC (8.2). If so, the computer 20 calculates the first field address (8.3) and sets the current read address equal to the calculated field address (8.4). This freezes the play back on the first frame of the program segment stored in the cache. If the record time is not less than the START TC, the computer determines whether record time is greater than END TC (8.5). If so, the computer calculates the last field address (8.6) and sets the read address equal to the calculated address (.8.4). This freezes the play back on the last frame of the program segment. If neither condition exists, the computer calculates the read address (8.7) accordingly to the following formula:

rd addr = recvtr time − (size + overflow) − offset

If read address is less than head the read addres is calculated using the following formula:

rd addr − tail + 1 + (rd addr − head)

From the foregoing, it is apparent that the post production system 10 of the present invention makes multiple generation editing a normal operation. Source materials can be added to the program one at a time in multiple layers so that a single course machine and single channel digital effects unit could be used to create the same effects which now require multiple source machines and a multiple channel digital effects unit. The key to the post production system is the use of a video cache which records and plays back program segment.

The present invention, may of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A closed loop post production process for assembling a body of video source material in a series of jobs into a master video program, wherein each job comprises:
    (a) presenting video source material to a video editing device;
    (b) editing the video source material to create a new program segment for the master program;
    (c) simultaneously recording the new program segment into a master program media and into the current record section of a temporary video media storage having separate record and playback sections;
    (d) playing back a previously recorded program segment from the playback section of the temporary video storage media synchronously with the master program recorded on the master program media;
    (e) presenting the previously recorded program segment from the playback section of the video storage media to the video editing device so that such previously recorded program segment is available as source material for creating the new program segment; and
    (f) switching the record and playback sections of the temporary video storage media at the completion of the job, so that the new program segment recorded during the current job is played back during a subsequent job.

2. The closed loop post production process according to claim 1 wherein the temporary video storage media is a digital source device.

3. The closed loop post production process according to claim 2 wherein the temporary video storage media is a random access memory device.

4. The closed loop post production process according to claim 1 wherein the video source material is digitized and subsequently edited in the digital domain.

5. The closed loop post production process according to claim 4 wherein the master program media is a digital tape.

6. A post production system for editing pre-existing source materials into a master program in a series of jobs comprising:
    (a) at least one source machine for playing unedited video source material;
    (b) means for editing video source material during each job to create a new program segment;
    (c) means for recording the new program segment onto a master program media;
    (d) a temporary video storage media having at separate record and playback sections;
    (e) means for recording the new program segment into the record section of the temporary video storage media simultaneously with the recording of the new program segment into the master program media;
    (f) means for playing back a previously recorded program segment from the playback section of the temporary video storage media and presenting the previously recorded program segment to the editing means while simultaneously recording the new program segment so that it is available as source material for creating the new program segment;
    (g) means for switching the record and playback sections of the temporary video storage media at the completion of a job so that the new program segment recorded during a job is played back during a subsequent job.

7. The post production system according to claim 6 wherein the temporary video storage media is a digital memory device.

8. The post production system according to claim 7 wherein the editing means is a digital editing device.

9. The post production system according to claim 8 wherein the master program media is a digital tape.

10. A closed loop past production process for assembling a body of video source material into a master program in a series of jobs, wherein each job comprises:
    (a) presenting video source material to a video editing device;
    (b) editing the video source material to a create a new program segment for the master program;
    (c) simultaneously recording the new program segment into a master program media and a temporary video storage media;
    (d) playing back a previously recorded program segment recorded during a previous job from the temporary video storage media while simultaneously recording the new program segment;
    (e) presenting the previously recorded program segment to the video editing device so that the previously recorded program segment is available as source material for creating the new program segment.

* * * * *